(12) United States Patent
Chefd'hotel et al.

(10) Patent No.: US 10,540,771 B2
(45) Date of Patent: Jan. 21, 2020

(54) SYSTEM AND METHOD FOR IMAGE SEGMENTATION

(71) Applicant: Ventana Medical Systems, Inc., Tucson, AZ (US)

(72) Inventors: Christophe Chefd'hotel, San Jose, CA (US); Stanley Ho, Fremont, CA (US); Yao Nie, Sunnyvale, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 7 days.

(21) Appl. No.: 15/710,588

(22) Filed: Sep. 20, 2017

(65) Prior Publication Data
US 2018/0012365 A1      Jan. 11, 2018

Related U.S. Application Data

(63) Continuation of application No. PCT/EP2016/056027, filed on Mar. 18, 2016.

(60) Provisional application No. 62/136,381, filed on Mar. 20, 2015.

(51) Int. Cl.
| | |
|---|---|
| *G06T 7/187* | (2017.01) |
| *G06T 7/11* | (2017.01) |
| *G06T 7/162* | (2017.01) |
| *G06T 7/12* | (2017.01) |
| *G06T 7/168* | (2017.01) |

(52) U.S. Cl.
CPC .............. *G06T 7/187* (2017.01); *G06T 7/12* (2017.01); *G06T 7/162* (2017.01); *G06T 7/168* (2017.01); *G06T 2207/20156* (2013.01); *G06T 2207/30024* (2013.01)

(58) Field of Classification Search
None
See application file for complete search history.

(56) References Cited

U.S. PATENT DOCUMENTS

| | | | | |
|---|---|---|---|---|
| 8,588,509 | B1 * | 11/2013 | Fua ...................... | H01J 37/265 |
| | | | | 382/144 |
| 2015/0139546 | A1 * | 5/2015 | Sagawa ..................... | G06T 7/11 |
| | | | | 382/173 |
| 2015/0187070 | A1 * | 7/2015 | Cheng ....................... | G06T 7/11 |
| | | | | 382/128 |
| 2015/0371397 | A1 * | 12/2015 | Wang ..................... | G01B 11/14 |
| | | | | 382/159 |
| 2016/0070976 | A1 * | 3/2016 | Aoba ................... | G06K 9/4671 |
| | | | | 382/180 |

OTHER PUBLICATIONS

Denek, Ondrej; Graph Cut Based Image Segmentation in Fluorescence Microscopy, 2012, https://is.muni.cz/th/zalxp/thesis-final.pdf . (Year: 2012).*

(Continued)

*Primary Examiner* — Andrae S Allison
(74) *Attorney, Agent, or Firm* — Kilpatrick Townsend & Stockton LLP

(57) ABSTRACT

An image segmentation method is disclosed that allows a user to select image component types, for example tissue types and or background, and have the method of the present invention segment the image according to the user's input utilizing the superpixel image feature data and spatial relationships.

14 Claims, 12 Drawing Sheets
(10 of 12 Drawing Sheet(s) Filed in Color)

(56) References Cited

OTHER PUBLICATIONS

Benesova et al, Fast Superpixel Segmentation Using Morphological Processing, Proceedings of the International Conference of Machine Vision and Machine Learning Prague, Czech Republic, Aug. 14-15, 2014, Paper No. 67 (Year: 2014).*

Zhang et al, A Simple Algorithm of Superpixel Segmentation With Boundary Constraint, IEEE Transactions on Circuits and Systems for Video Technology, vol. 27, No. 7, Jul. 2017 (Year: 2017).*

Achanta et al, 2012, "SLIC Superpixels Compared to State-of-the-art Superpixel Methods", IEEE Transactions on Pattern Analysis and Machine Intelligence.

Artan, Yusuf, 2011, "Interactive image segmentation using machine learning techniques", 2011 Canadian conference on Computer and Robot Vision.

Bai et al, 2007, "A geodesic framework for fast interactive image and video segmentation and matting", IEEE ICCV, 8 pp.

Boykov et al, 2001, "Interactive graph cuts for optimal boundary and region segmentation of objects in ND Images", IEEE ICCV, pp. 105-112.

Chen et al, 2014, "Stain unmixing in brightheld multiplex immunohistochemistry images", MICCAI Workshop on Sparsity Techniques in Medical Imaging.

Dijkstra, E. W., 1959, "A note on two problems in connexion with graphs", Numerische Mathematik, 1(1):269-271.

Falcao et al, 2004, "The image foresting transform: theory, algorithms, and applications", IEEE Transactions on Pattern Analysis and Machine Intelligence, 26(1):19-29.

Felzenszwalb et al, 2004, "Efficient Graph-Based Image Segmentation", International Journal of Computer Vision, 59(2):167-181.

Grady, L., 2006, "Random walks for image segmentation", IEEE Transactions on Pattern Analysis and Machine Intelligence, 28(11):1768-1783.

International Search Report & Written Opinion dated Jul. 6, 2016 in corresponding Application No. PCT/EP2016/056027, 19 pages.

Lee et al, 2014, "Interactive segmentation as supervised classification with superpixels", Workshops on Computer Vision and Human Computation (CVPR).

Levinshtein et al, 2009, "Turbopixels: Fast superpixels using geometric flows", IEEE Transactions on Pattern Analysis and Machine Intelligence (PAMI).

Mikolajczyk et al, 2005, "A Performance Evaluation of Local Descriptors", IEEE Transactions on Pattern Analysis and Machine Intelligence, 27:1615-1630.

Nguyen et al, 2015, "Adaptive Whole Slide Tissue Segmentation to Handle Inter-slide Tissue Variability", Proc. of SPIE, 9420:94200P-1-94200P-8.

Protier et al, 2007, "Interactive image segmentation via adaptive weighted distances", IEEE Transactions on Imaging Processing, 16(4):1046-1057.

Rauber et al, 2013, "Interactive segmentation by image foresting transform on superpixel graph", 26th Conference on Graphics, Patterns and Images (SIBGRAPI).

Rother et al, 2004, "Grabcut: Interactive foreground extraction using iterated graph cuts", ACM SIGGRAPH, 2004.

Roullier et al, Multi-resolution graph-based analysis of histopathological whole slide images: Application to mitotic cell extraction and visualization, Computerized Medical Imaging and Graphics, 2011, pp. 603-615, vol. 35.

Ruifrok et al., Quantification of Histochemical Staining by Color Deconvolution, Analytical and Quantitative Cytology and Histology, Aug. 2001, pp. 291-299, vol. 23, No. 4.

Shi et al, 2000, "Normalized cuts and image segmentation", IEEE Transactions on Pattern Analysis and Machine Intelligence (PAMI), 22(8):888-905.

Ta et al, 2009, "Graph-based tools for microscopic cellular image segmentation", Pattern Recognition, 42(6) 1114-1120[sic], 1123[sic].

Tan et al, 2014, "Multi-scale superpixels classification for optic cup localization", IEEE International Symposium on Biomedical Imaging (ISBI), 2014.

Veksler et al, 2010, "Superpixels and supervoxels in an energy optimization framework", European Conference on Computer Vision (ECCV).

Yang et al, 2010, "User-friendly interactive image segmentation through unified combinatorial user inputs", IEEE Transactions on Image Processing, 19(9):2470-2479.

* cited by examiner

SYSTEM AND METHOD FOR IMAGE SEGMENTATION

CROSS-REFERENCE TO THE RELATED APPLICATIONS

This patent application is a continuation of International Patent Application No. PCT/EP2016/056027 filed Mar. 18, 2016, which claims priority to and the benefit of U.S. Provisional Application No. 62/136,381 filed Mar. 20, 2015. Each of the above patent applications is incorporated herein by reference as if set forth in its entirety.

FIELD OF INVENTION

The present disclosure relates to image analysis methods. More particularly, the present invention relates to image segmentation.

BACKGROUND

Image segmentation is one of the most fundamental and challenging problem in image processing. Considering the user involvement during the segmentation process, there are three main categories, i.e., fully automatic, semi-automatic and manual methods. In general, the three categories exhibit increasing levels of segmentation accuracy and flexibility at the expense of user interactions. The interactive segmentation framework proposed in this work falls into the second category. In general, the computer implemented method of the present invention achieves segmentation after the user provides a set of markings which roughly label the regions to be extracted. This type of segmentation methods are found very desirable for complex images as well as subjective applications.

A number of interactive segmentation algorithms have been introduced in the literature, which include *Graph Cut* based methods [1] [2], *Geodesic* method [3] [4], and *Random Walks* based methods[5][6]. All these algorithms treat the image as a weighted graph with nodes corresponding to the pixels in the images and edge being placed between neighboring pixels. A certain energy function is defined and minimized on this graph to generate the segmentation. In recent years, superpixel [10] based algorithms were used increasingly [7] [8] [9]. By using superpixel technique, pixels are grouped into perceptually meaningful atomic regions, which can be used to replace the rigid structure of the pixel grid. Superpixels capture image redundancy, provide a convenient primitive from which to compute image features, and greatly reduce the complexity of subsequent image processing tasks [10].

Typically, whole slide digital images have enormous data densities, and characterized by their heterogeneity and histopathology contents. For example, a typical IHC stained image for breast tumor tissue digitized at 20× resolution can have 30,000×30,000 elements, which is approximately 900million pixels in total for a single image. With respect to superpixels, larger superpixel segments provide richer features but may result in under segmentation. Conversely, smaller scale segments have less discriminative features but usually offer better boundary fit [11].

Image segmentation is a computationally demanding task. Nevertheless, it is desirable to have a segmentation method where users can provide input according to the image at hand.

SUMMARY

In one aspect, the invention relates to an image analysis system for segmenting a digital image of a biological sample. The digital image comprises at least a first image component depicting a first tissue type of the biological sample and a second image component depicting a second tissue type of the biological sample or depicting background. The image analysis system comprises an interface for receiving the digital image and a processor configured for performing the segmentation. The segmentation comprises:

identifying a plurality of superpixels in the received digital image;

for each of the superpixels, extracting a feature set, the feature set comprising and/or being derived from pixel intensity values of pixels contained in said superpixel;

receiving at least a first and a second marking, the first marking covering one or more first ones of the superpixels, the first marked superpixels representing regions of the first image component, the second marking covering one or more second ones of the superpixels, the second marked superpixels representing regions of the second image component; for example, a user may use his mouse or any other input device for indicating that some superpixels should be marked in a first color "red" as representing connective tissue and may use the input device for indicating that some other superpixels should be marked in a second color "green" as representing tumor tissue;

Optionally, the user may add third and even further markings depending on the type of tissue sample used and the type of tissues that shall be identified during image segmentation; all other superpixels not being covered by one of said marking at all or whose center is not covered by any of said markings are in the following referred to as "unmarked" superpixels.

The segmentation comprises, for each unmarked superpixel of the plurality of superpixels:

computing a first combined distance between said unmarked superpixel and the one or more first marked superpixels, the first combined distance being a derivative of a feature-set-dependent distance between said unmarked superpixel and the one or more first marked superpixels and of a spatial distance between said unmarked superpixel and the one or more first marked superpixels; A "feature-set-dependent distance" as used herein is a distance measure that is completely or at least partially derived from pixel intensity information. For example, pixel intensity values of different superpixels may be compared directly or may be used for computing some gradient- and/or texture related features first and then in a further step computing a feature-set-dependent distance by comparing said intensity-derived features of the two different superpixels; the feature-set-dependent distance between said unmarked superpixel and the one or more first marked superpixels is preferentially not computed as a direct comparison between the unmarked superpixel and the one or more first marked superpixels but rather by computing feature-set-dependent distances between neighboring pairs of superpixels and using said distances along a path in a graph connecting the unmarked superpixel with the first marked superpixels for computing the feature-set-dependent distance between said unmarked superpixel and the one or more first marked superpixels.

computing a second combined distance between said unmarked superpixel and the one or more second marked superpixels, the second combined distance being a derivative of a feature-set-dependent distance between said unmarked superpixel and the one or more second marked superpixels and of a spatial distance between said unmarked superpixel and the one or more second marked superpixels; for example, the feature-set-dependent distance between said unmarked superpixel and the one or more second marked superpixels may be computed by means of a graph traversal algorithm as indicated already for the computation of the first combined distance; assigning the unmarked superpixel to the first image component if the first combined distance is smaller than the second combined distance and otherwise associating the unmarked superpixel to the second image component, thereby segmenting the digital image.

In a further aspect, the invention relates to a corresponding automated image analysis method to be performed by an image analysis system according to embodiments of the invention.

In a further aspect, an image segmentation method is disclosed that allows a user to select image component types, for example tissue types and or background, and have the method of the present invention segment the image according to the user's input utilizing the superpixel image feature data and spatial relationships.

In a further aspect, a computer-implemented method for image segmentation is disclosed wherein one or more processors of a computer process computer instructions stored in a non-transitory computer-readable medium, wherein the instructions include, for example: receiving an input image; dividing the image into superpixels; calculating appearance information for each superpixel, the appearance calculating steps including calculating, for each channel in the image, at least one of a histogram and a vector of pixel intensity information for pixels of each superpixel; calculating, for each channel in the image, at least one of a histogram and a vector of the gradient intensity information associated with the pixels of each superpixel; calculating, for each channel in the image, at least one of a histogram and a vector of the gradient orientation information associated with the pixels of each superpixel; and identifying spatial information associated with each superpixel. The spatial information identifying steps involve identifying the center of each superpixel; associating the center of each superpixel with the center of each neighboring superpixels and forming associated superpixel pairs, wherein a neighboring superpixels have a common boundary. The method also involves calculating a similarity measure between each associated superpixel pairs; receiving a first annotation, wherein the first annotation corresponds to a first marking made on a first image component type; receiving a second annotation, wherein the second annotation corresponds to a second marking made on a second image component type, and wherein the first image component type is different from the second image component type, and wherein the first annotation and second annotation are markings; identifying a first location wherein at least part of the first annotation overlaps at least part of a first superpixel, and associating a first label with the first annotation; identifying a second location wherein at least part of the second annotation overlaps at least part of a second superpixel and associating a second label with the second annotation; and segmenting the image according to the first image component type and the second image component type. The image segmenting steps involve identifying the centers of each of the superpixels that did not intersect the first annotation or the second annotation, wherein each of the centers of superpixels that did not intersect the first annotation or the second annotation is an unmarked superpixel center; and associating the first label or the second label with each unmarked superpixel center based on the spatial determinations and a weighting using the similarity measures between associated superpixel pairs.

In an embodiment of the present invention, the spatial determination involves computing a path distance between the unmarked superpixel center and each of the first superpixel center and the second superpixel center. The path distance is computed as the sum of the similarity measures between the associated superpixels pairs along the path. The path distance can also be computed as the lowest similarity measure (or largest difference measure) between associated superpixel pairs along the path.

In another embodiment of the invention, the computer-implemented method involves finding and comparing the shortest path distances from the unmarked superpixel center to each of the first and second marked superpixel centers, and wherein when the unmarked superpixel center is closest to one of the centers of the first marked superpixels, the unmarked superpixel center is associated with the first label, and wherein when the unmarked superpixel center is closest to one of the centers of the second marked superpixels, the unmarked superpixel center is associated with the second label.

In another embodiment of the present invention a semi-automatic seed, annotation, or marking placement algorithm is disclosed. The computer-implemented algorithm automatically place seeds or additional seeds on the image based on the markings, or annotations provided by the user, thus further reduce the manual work needed from the user. For example, the method involves automatically generating annotations or seeds, wherein an automatic annotation module generates one or more computer-generated annotations based on a similarity determination, and wherein the similarity determination involves identifying image component areas in the image that are substantially similar to at least one of the first image component type and the second image component type, and associating the image component areas with the first label or the second label based on the similarity determination. Note that automatic seed placement is optional to the user, who can decide to turn on/off according to the complexity of the input image. The user can also refine the automatically added seeds in case they do not match the user preference. FIG. 8(a) shows the segmentation result using the proposed method, which is comparable to the result obtained by manually adding elaborate markings (FIG. 8(b)).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
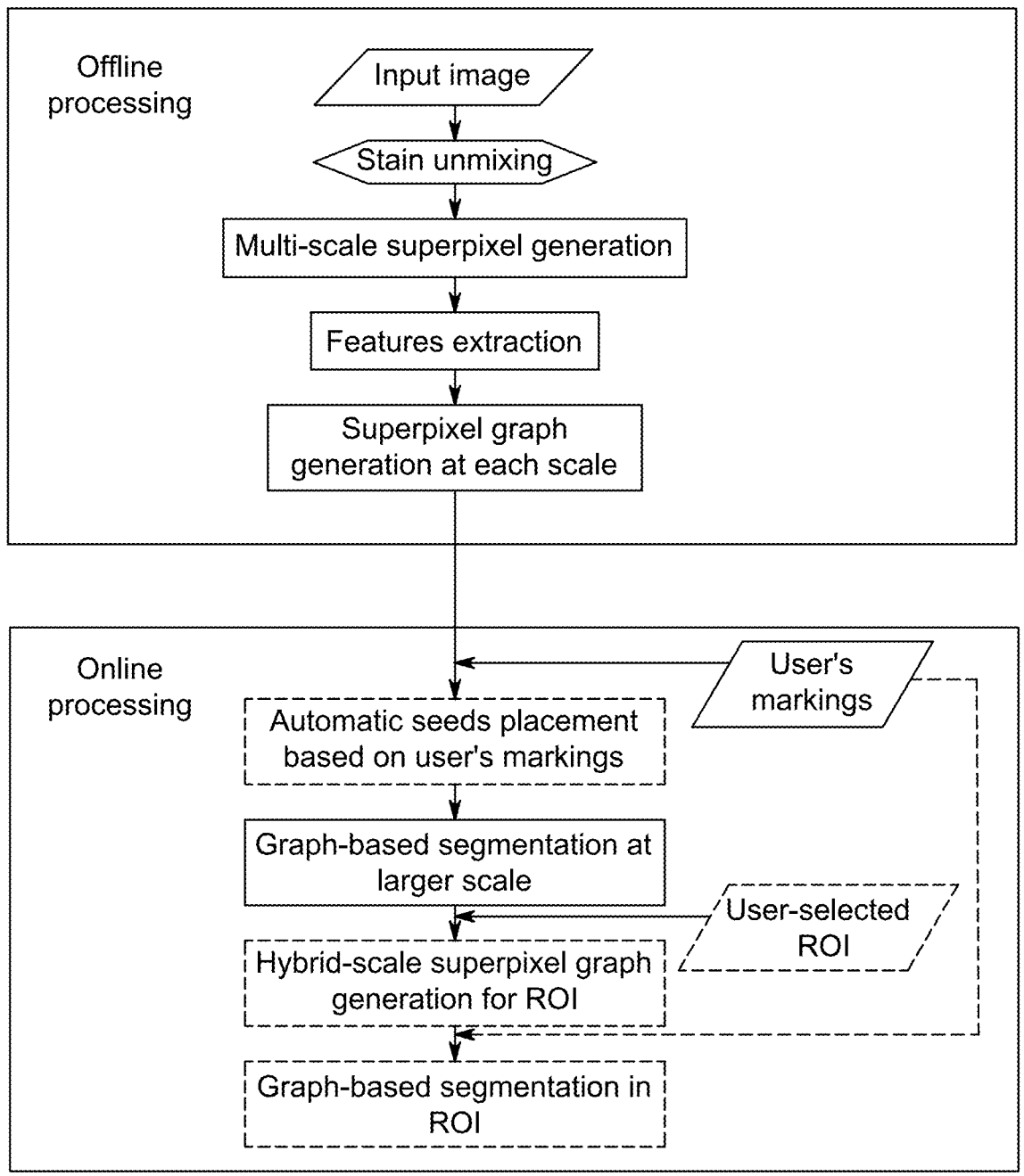
FIG. 1 illustrates the general framework of the propose algorithm. The components with dotted boundary/line represent optional processing which are triggered by the user.
Figure 2A:
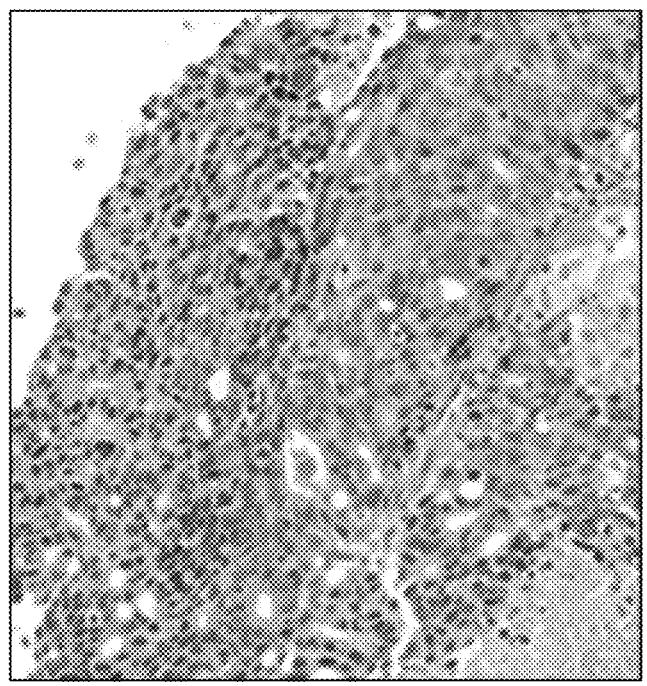
FIGS. 2A-2D illustrate an example of H&E image and the resulting stain channel images after stain unmixing. (A) Original image, (B) Illumination channel, (C) Haematoxylin channel, (D) Eosin channel.
Figure 2B:
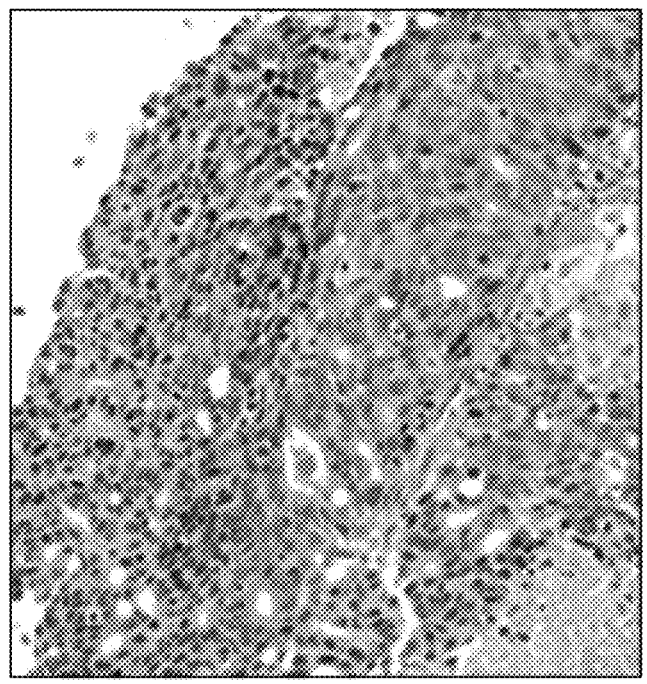
Figure 2C:
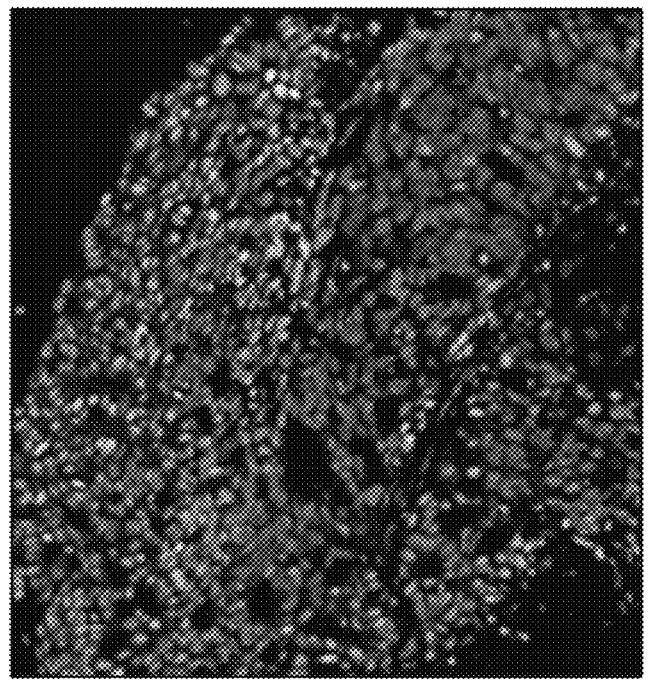
Figure 2D:
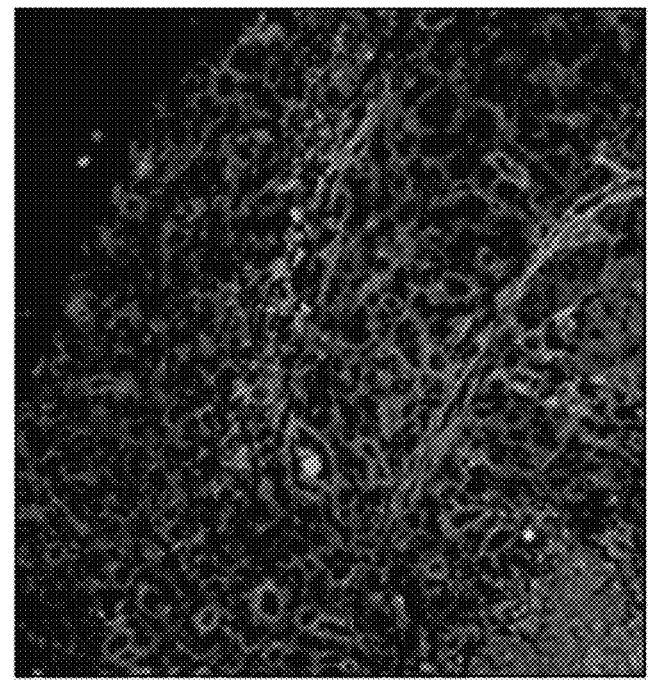

Embodiments of an image analysis system for segmenting a digital image of a biological sample are described herein. The digital image comprises at least a first image component depicting a first tissue type of the biological sample and a second image component depicting a second tissue type of the biological sample or background (e.g. a region corresponding to the glass of the carrier slide being free of any cells). The image analysis system comprises an interface for receiving the digital image, e.g. a network interface for receiving the image via a network such as the internet or the intranet or an I/O interface for reading image files from a computer-readable non-transitory storage medium like a hard disk drive or an interface for directly receiving the digital image from a camera, e.g. the camera of a slide scanning microscope. The digital image analysis system further comprises a processor configured for performing the image segmentation. The segmentation comprises:

identifying a plurality of superpixels in the received digital image; for example, the digital image may be analyzed and a state-of-the art super-pixel identification method may be applied;

for each of the superpixels, extracting a feature set. The feature set comprises and/or is derived from pixel intensity values of pixels contained in said superpixel; For example, pixel intensity histograms, textures, intensity gradient information and other features derived from pixel intensity values can be computed from the received digital image;

receiving at least a first and a second marking; for example, the first and second marking can be scribbles of a user in two different colors; the first marking covers one or more first ones of the superpixels, the first marked superpixels representing regions of the first image component, the second marking covering one or more second ones of the superpixels, the second marked superpixels representing regions of the second image component;

for each unmarked superpixel of the plurality of superpixels:

computing a first combined distance between said unmarked superpixel and the one or more first marked superpixels, the first combined distance being a derivative of a feature-set-dependent distance between said unmarked superpixel and the one or more first marked superpixels and of a spatial distance between said unmarked superpixel and the one or more first marked superpixels;

computing a second combined distance between said unmarked superpixel and the one or more second marked superpixels, the second combined distance being a derivative of a feature-set-dependent distance between said unmarked superpixel and the one or more second marked superpixels and of a spatial distance between said unmarked superpixel and the one or more second marked superpixels;

assigning the unmarked superpixel to the first image component if the first combined distance is smaller than the second combined distance and otherwise associating the unmarked superpixel to the second image component, thereby segmenting the digital image.

Using a combination of intensity-derived and spatial features for computing the "distance" between superpixels may have the advantage that a more accurate method of identifying similar superpixels is provided compared to purely intensity-based image segmentation methods.

A "distance measure" as used herein is a kind of similarity measure, whereby a high distance corresponds to low similarity and vice versa.

An "unmarked superpixel" as used herein is, for example, a superpixel that is not even partially covered by one of the markings. According to other embodiments, an unmarked superpixel is a superpixel whose center is not covered by one of the (first or second or any further) markings.

According to embodiments, the processor is further configured for representing the plurality of superpixels as a graph. Thereby, the center of each of the identified superpixels is represented as a node. The nodes representing centers of adjacent superpixels are connected by a respective edge. Thus, the received digital image is transformed into a large connected graph whose nodes represent the identified superpixels.

Representing the superpixels as nodes of a graph may be advantageous as a data structure is provided that can be used for efficiently incorporating spatial information for computing spatially dependent distance measures.

According to embodiments, the representation of the plurality of superpixels as a graph comprises: for each of the edges, the processor computes a weight ("edge weight") by comparing the feature sets of the neighboring superpixels connected by said edge, whereby the weight negatively correlates with the degree of similarity of the compared feature sets. This means that a large edge weight indicates that the superpixels (whose nodes are) connected by said edge have very dissimilar pixel intensity derived feature sets and thus likely belong to different image component/tissue type. A low edge weight indicates similarity of intensity-derived features.

According to embodiments, the processor is configured for performing a pre-processing operation. The pre-processing operation is performed before the first and second markings are received. For example, the pre-processing can be performed immediately after receiving the digital image and the results of the preprocessing, e.g. one or more image channels, one or more (channel specific) feature sets, one or more sets of superpixel-images having superpixels of different scales, one or more graphs derived for each of said superpixel scales may be stored on in a computer-readable non-transitory storage medium for being used as input for other processing steps. Said other processing steps may also be referred to as "online" or "interactive" or "real-time"

processing steps as said steps are typically performed interactively, i.e., in response to data that was input by a user (e.g. the first and second markings, and optionally a selection of one or more regions of interest may be performed by a user via a graphical user interface (GUI).

The pre-processing operation comprises: performing the identification of the plurality of superpixels (mentioned previously and in accordance with any one of the embodiments described herein); performing, for each of the superpixels, the extraction of the feature set (mentioned previously and in accordance with any one of the embodiments described herein); and performing the representation of the plurality of superpixels as the graph (mentioned previously and in accordance with any one of the embodiments described herein).

In addition the processor is configured to perform, after having executed the pre-processing operation (e.g. in the "online" or "real time" processing phase), the following operations:

using the graph for computing the first and second combined distance; for example, the graph may comprise pixel-intensity-derived distance information in the form of edge weights and may comprise spatial information in the form of its graph topology, e.g. the length of the shortest path connecting an unmarked superpixel with any one of the first or second marked superpixels;

receiving another first and another second marking, the other first marking covering one or more other first marked ones of the superpixels, the other first marked superpixels representing other regions of the first image component, the other second marking covering one or more other second marked ones of the superpixels, the other second marked superpixels representing other regions of the second image component; for example, a user may have noticed that his or her first and second markings that were made in a previous step yield an insufficient segmentation result, e.g. because some image regions were wrongly assigned to one of the markings; in this case, the user may specify a new first and/or a new second marking in addition to or in replacement of the previously entered first and second marking;

computing, for each of the superpixels, another first and another second combined distance using the topology of the graph and the other first and second markings; for example, this computing step may be triggered by the user specifying and entering the new first and/or second marking via a GUI provided by the image analysis system; the computation of the other (new) first and second combined distances may be performed as described herein for various embodiments of the invention and as already described in detail with respect to the first and second marking;

re-segmenting the digital image by associating unmarked superpixel to the first image component if the other first combined distance is smaller than the other second combined distance and otherwise associating the unmarked superpixel to the second image component.

Said features may be advantageous, as the user is provided with means to interactively modify the markings, thereby triggering a re-computation of the combined distance measures but preferentially not a re-computation of the feature sets or the edge weights and the corresponding graph(s). This may be highly advantageous as a user can easily modify the markings for improving the segmentation results and get an immediate, real-time feedback in the form of a new segmentation that is based on the new markings. As the most CPU-demanding tasks (feature extraction and comparison, superpixel identification) have been executed in a pre-processing step whose results are re-used in each re-computation of the combined distance computation and superpixel assignment step, the computation of a new segmentation can be performed very quickly and in a CPU-saving manner.

Thus, embodiments of the invention provide for an interactive segmentation framework enabling a user to adjust the segmentation results interactively as needed and receive immediate feedback information if the operation was successful.

According to embodiments, any user-input-action caused by a user adding a new marking or selecting a corresponding "trigger GUI element", e.g. selecting a "segment!" button, triggers be recomputed quickly and in real time According to embodiments, the processor is configured for generating a graphical user interface (GUI) which enables a user to mark one or more superpixels with a color selected from a plurality of different colors. For example, the GUI may comprise a virtual pen-tool or a virtual brush-tool and a color picker and enable a user to pick a particular color, e.g. "red", and then mark one or more superpixels as "red" by moving the cursor, e.g. in accordance with the user's movement of a mouse, over a screen presenting the tissue sample and its superpixels. For example, the user may mark some superpixels representing typical connective tissue with a first marking, e.g. a red color, and may mark superpixels representing typical endothelial cells with a second color, e.g. "blue". In some embodiments, special input and output devices may be used for entering the markings, e.g. a stylus or a touch screen and/or for displaying the segmentation results, e.g. a pen monitor or a touch screen monitor.

According to embodiments, the extraction of the feature set for each of the superpixels comprises:

generating an intensity histogram from all pixels contained in said superpixel; and/or computing a gradient direction histogram from all pixels contained in said superpixel, the gradient direction being indicative of the direction of a directional change in the intensity in the digital image; and/or computing a gradient magnitude histogram from all pixels contained in said superpixel, the gradient magnitude being indicative of the magnitude of a directional change in the intensity in the digital image; and/or computing a texture feature from all pixels contained in said superpixel; and/or computing any other kind of pixel-intensity derived feature or a combination of one or more of the foregoing features.

According to embodiments, the gradient magnitude histogram and/or the gradient direction histogram are computed by computing a gradient image in a pre-processing operation and then using the gradient image for computing a superpixel-specific gradient magnitude histogram for a plurality of predefined gradient magnitude bins and for computing a superpixel-specific gradient direction histogram for a plurality of predefined gradient angle bins.

A "histogram" is a data structure indicating the distribution of intensity values of pixels contained in a particular superpixel. To construct a histogram, the first step is to "bin" the range of values—that is, divide the entire range of pixel intensity values of said superpixel into a series of intervals ("bins")—and then count how many intensity values fall into each interval. The bins are usually specified as consecutive, non-overlapping intervals of the variable for which the histogram is made (e.g. pixel intensity). The bins (intervals) must be adjacent, and are usually equal size A 'gradient magnitude image' as used herein is a digital image whose pixels respectively are indicative of the magnitude of a directional change in the intensity or color in a source image.

A 'gradient direction image' as used herein is a digital image whose pixels respectively are indicative of the direction of a directional change in the intensity or color in a source image.

For example, a gradient image can be computed from a source image, each pixel of the gradient image having assigned a 2D vector with the components given by the derivatives of an image intensity function in the horizontal and vertical directions. At each image point, the gradient vector points in the direction of largest possible intensity increase in the source image, and the length of the gradient vector corresponds to the rate of change in that direction. The information contained in said gradient image can be split into a gradient magnitude image and a gradient direction image or the gradient image may in fact be considered as and may be used as a combination of a gradient magnitude image and a gradient direction image. For example, one way to compute the image gradient is to convolve an image with a kernel, such as the Sobel operator or Prewitt operator.

According to embodiments, the feature set of each superpixel comprises one or more histograms. The extraction of the first feature set for a superpixel comprises computing the histograms and optionally further pixel-intensity derived features, e.g. texture features.

According to embodiments, the intensity histogram, the gradient direction histogram and/or the gradient magnitude histogram of all superpixels are binned histograms comprising a predefined number of bins. For example, 10 bins can be used for all three types of histograms. In some embodiments, the histograms of different type may have different bin numbers. For example, the intensity histogram of all super pixels (SPs) may have 10 bins, the gradient direction histograms of all SPs may have 12 bins and the gradient magnitude histograms of all SPs may have 14 bins. Binning the histograms significantly reduces the CPU resources consumed for computing feature set based distances, e.g. for edge weight computation during a pre-processing step. Using a bin number in the range of 6-18 has been observed to provide a good compromise between speed and accuracy of intensity-based distance computation.

According to embodiments, each of the computed weights assigned to one of the edges is:
 a histogram-distance between the two intensity histograms computed for the two nodes connected by said edge; or
 a histogram-distance between the two gradient magnitude histograms computed for the two nodes connected by said edge; or
 a histogram-distance between the two gradient direction histograms computed for the two nodes connected by said edge; or
 a distance computed as a derivative of one or more of said histogram-distances and optionally further features, e.g. texture features. A histogram distance can be, for example, a quadratic-Chi Histogram Distance or other histogram distances known in the art.

This may be advantageous as histogram-based features have been observed to provide very good segmentation accuracy. Their computation is computationally demanding, but by performing the feature extraction task in a preprocessing step, it is possible to make use of the information contained in histograms for performing real-time image segmentation.

According to embodiments the computation of the first combined distance for any of the unmarked superpixels comprises:
 computing a first path distance for each of a plurality of first paths; each first path connects the node representing the center of the unmarked superpixel and a node representing a center of one of the first marked superpixels; each first path distance is computed as the sum of the weights of the edges between neighboring superpixels pairs along a respective one of the first paths; and
 using the minimum computed first path distance (i.e., the path distance of the one of the first path having the minimum sum of edge weights of the edges constituting said path) as the first combined distance calculated for the unmarked superpixel.

The computation of the second combined distance for any of the unmarked superpixels comprises:
 computing a second path distance for each of a plurality of second paths; each second path connects the node representing the center of the unmarked superpixel and a node representing a center of one of the second marked superpixels; each second path distance is computed as the sum of the weights of the edges between neighboring superpixels pairs along a respective one of the second paths; and
 using the minimum computed second path distance as the second combined distance calculated for the unmarked superpixel.

Computing path distances by summing up edge weights along a path and identifying the first and second path having the minimum path distance may be advantageous as in this way spatial information (graph topology) as well as intensity-related information (edge weights) are considered both for computing the distance (and thus implicitly the similarity) between an unmarked superpixel and a marked superpixel. As the edge weights may be computed in a pre-processing step, the distance computation can be implemented quickly by using a graph traversal algorithm. The higher the number of edges and nodes in a path and the higher the weights, the higher the distance between a superpixel and a marked superpixel constituting the ends of the path.

According to embodiments, the computation of the first combined distance for any of the unmarked superpixels comprises:
 computing a first path distance for each of a plurality of first paths, each first path connecting the node representing the center of the unmarked superpixel and a node representing a center of one of the first marked superpixels, each first path distance being the maximum weight assigned to any one of the edges between neighboring superpixels pairs along a respective one of the first paths; and
 using the minimum computed first path distance as the first combined distance calculated for the unmarked superpixel;

The computation of the second combined distance for any of the unmarked superpixels comprises:
 computing a second path distance for each of a plurality of second paths, each second path connecting the node representing the center of the unmarked superpixel and a node representing a center of one of the second marked superpixels, each second path distance being the maximum weight assigned to any one of the edges between neighboring superpixels pairs along a respective one of the second paths; and using the minimum computed second path distance as the second combined distance calculated for the unmarked superpixel.

Encoding image intensity-based distance information in the edge weights and using the maximum edge weight within a path as the distance score of the whole path may be advantageous as this approach is particularly suited for segmenting objects with very irregular shapes which may require a long path to span the object.

According to embodiments, the processor is configured for performing the identification of the plurality of superpixels in the received digital image such that each superpixel has, given the resolution of the received digital image, a minimum size that is the typical size of a cell nucleus (e.g. 5 μm).

According to embodiments, the processor is configured for identifying a further plurality of superpixels in the received digital image, whereby each of the further superpixels in the further plurality of superpixels has, given the resolution of the received digital image, a second minimum size. The second minimum size is at least 1.5 times the typical size of a cell nucleus; and performing the feature set extraction in addition for the further plurality of superpixels. The minimum size may be measured e.g. in the minimum total number of pixels in a superpixel.

Computing for a given digital image at least two different sets of superpixels, each set being identified by using a different minimum superpixel size and corresponding to a respective scales may be advantageous as a good compromise can be made between computational resource consumption and accuracy: according to preferred embodiments, the superpixel identification, feature extraction and graph generation is performed for each of the scales in a pre-processing step and the respective results (scale-specific superpixel sets, extracted features, graphs and edge-weights) are stored in a computer-readable non-transitory storage medium and are used as input in an "online"/"interactive" image segmentation process.

According to embodiments, the processor is configured for executing, in a pre-processing operation:
performing the identification of the plurality of superpixels in the received digital image such that each superpixel has a first minimum size (e.g. 1.5 times a cell nucleus size) and performing the representation of said plurality of superpixels in a first graph; the representation in a graph may be performed as described herein for embodiments of the invention and may comprise, for example, the extraction of histograms and other features and the computation of edge weights and
identifying a further plurality of superpixels in the received digital image such that each of the further superpixels has a further minimum size that is smaller than the first minimum size and representing the further plurality of superpixels in a further graph; again, the representation in a graph may be performed as described herein for embodiments of the invention, this time using the further superpixels as the basis for feature extraction, graph generation and edge weight computation.

The processor is configured for executing, after completion of the pre-processing operation (e.g. in an interactive image segmentation procedure):
receiving a user's selection of a region of interest in the received digital image;
in response to the receiving of the user's selection, generating a hybrid superpixel graph, the hybrid superpixel graph representing digital image areas within the region of interest with nodes and edges of the further graph and representing superpixels outside the regions of interest with nodes and edges of the first graph; and
using the hybrid superpixel graph for computing the first and second combined distances and for assigning each unmarked first or further superpixel to the first or second image component.

Using a dynamically received user-selection for generating a hybrid graph from at least two precomputed superpixel graphs of different superpixel scales may be advantageous as the "default" image segmentation process may be performed by using the larger superpixels which is particularly fast but may not provide the best results for very diffuse tissue boundaries; in case a user determines that within a region in the image the image segmentation did not perform well or is too coarse grained for the underlying tissue region, the user can simply select this particular region as a region of interest. This selection will trigger the generation of a hybrid graph whose nodes representing the region of interest are derived from the superpixel graph having the smaller scale (i.e., being based on nodes representing centers of superpixels having been created by using the smaller minimum superpixel size). Thus, a user can trigger refining the image segmentation on a particular sub-region in an image, whereby the refined segmentation is computed in real-time.

Using multiple scales for computing different sets of superpixels may be advantageous as smaller scale leads to a greater total number of the superpixels, entailing higher segmentation accuracy but also more computation in the subsequent process. By supporting a multi-scale based, user-defined hybrid graph generation, a user can adjust the tradeoff according to the application needs.

According to embodiments, the processor is configured for:
generating a plurality of image channels by applying color deconvolution on the received digital image or by separating RGB color components of the digital image into respective image channels, wherein each of the image channels is a digital image whose pixel intensity values correspond to the color component of the respective channel; and
performing the feature set extraction such that for each of the superpixels and for each of the image channels a respective feature set is extracted.

For example, an intensity histogram, a gradient direction histogram, a gradient intensity histogram, and/or an image texture feature may be extracted from each of the image channels.

This may be advantageous as a larger number of features are considered for computing a distance measure, thereby increasing the segmentation accuracy. Each image channel may correspond to a respective biomarker-specific stain and/or a generic stain, e.g. hematoxylin.

According to embodiments, the processor is configured for comparing, for each of the plurality of image channels, the image channel specific feature set of at least one of the first marked superpixels with the image channel specific feature set of at least one of the second marked superpixels for obtaining an image channel specific marker-difference score. The computation of each of the edges according to any of the embodiments described herein comprises:

computing, for each of the image channels, a feature set distance by comparing the image channel specific feature sets of the neighboring superpixels connected by said edge;

multiplying the feature set distance obtained for each of the edges and for each of the image channels with the image channel specific marker-difference score computed for said image channel, thereby computing image-channel specific edge weights;

for each of the edges, aggregating (e.g. summing up) all image-channel specific edge weights and using the aggregated edge weight as the edge weight of the edge.

The image channel specific marker-difference score indicates a degree of pixel intensity and/or gradient difference in a particular image channel between a first marked superpixel and a second marked superpixel (or between a first feature set average created from a set of first marked superpixels and a second feature set average created from a set of second marked superpixels). Taking the predictive power of different image channels into account, edge weights can be computed that take into account different predictive powers of different stains and respective image channels, thereby generating segmentation results having increased accuracy.

According to embodiments, the image analysis system further comprises a data entry device, in particular a mouse or a data entry stylus. The first and/or second marker and optionally also the region of interest are selected by a user using the data entry device. Using specially adapted data entry tools e.g. for adding the marker may be particularly ergonomic and increase the efficiency of interacting with the GUI for triggering the image segmentation operations.

According to embodiments, the image analysis system further comprises a display monitor, in particular a touch screen monitor or a pen display monitor. The processor is configured for overlaying all superpixels assigned to the one or more first marked superpixels with a first color and for overlaying all superpixels assigned to the one or more second marked superpixels with a second color and for displaying the digital image and the overlaid first and second color via the display monitor.

The processor is configured for presenting the segmentation results on the display, thereby overlaying the unmarked superpixels with the color corresponding to the one of the marked superpixels to which they are assigned because said superpixel shows the lowest combined distance in respect to said marked superpixel. Said assignment may be implemented as a classification operation in accordance with a k-means classification algorithm, whereby the combined distance is used as distance measure.

According to embodiments, the biological sample is a histopathology sample, in particular a biopsy sample.

In a further aspect, the invention relates to a corresponding image analysis method for automatically segmenting a digital image of a biological sample. The digital image comprises at least a first image component depicting a first tissue type of the biological sample and a second image component depicting a second tissue type of the biological sample or background. The image analysis method is performed by an image analysis system. The image analysis method comprises:

identifying a plurality of superpixels in the received digital image;

for each of the superpixels, extracting a feature set, the feature set comprising and/or being derived from pixel intensity values of pixels contained in said superpixel;

receiving at least a first and a second marking, the first marking covering one or more first ones of the superpixels, the first marked superpixels representing regions of the first image component, the second marking covering one or more second ones of the superpixels, the second marked superpixels representing regions of the second image component;

for each unmarked superpixel of the plurality of superpixels:

computing a first combined distance between said unmarked superpixel and the one or more first marked superpixels, the first combined distance being a derivative of a feature-set-dependent distance between said unmarked superpixel and the one or more first marked superpixels and of a spatial distance between said unmarked superpixel and the one or more first marked superpixels;

computing a second combined distance between said unmarked superpixel and the one or more second marked superpixels, the second combined distance being a derivative of a feature-set-dependent distance between said unmarked superpixel and the one or more second marked superpixels and of a spatial distance between said unmarked superpixel and the one or more second marked superpixels;

assigning the unmarked superpixel to the first image component if the first combined distance is smaller than the second combined distance and otherwise associating the unmarked superpixel to the second image component, thereby segmenting the digital image.

In general, the computer implemented method according to embodiments of the present invention achieves segmentation after the user provides a set of markings which roughly label the regions to be extracted (i.e., regions to be separated during segmentation). This type of segmentation methods are found very desirable for complex images as well as subjective applications. The present invention is applicable to segmenting images into two or more image component types. In exemplary embodiments of the present invention, an image component type corresponds to a tissue type and/or background (e.g. the slide background).

In some embodiments, the computer implemented method may be implemented in the form of instructions (e.g., code) stored on a non-transitory computer-readable medium and executable by one or more processors of one or more computers. The non-transitory computer-readable medium can be implemented as any combination of any type of volatile or non-volatile memories, such as random-access memories (RAMs), read-only memories such as an Electrically-Erasable Programmable Read-Only Memory (EEPROM), flash memories, hard drives, solid state drives, optical discs, and the like. The non-transitory computer-readable medium can be integrated in the same device as the processor(s) or it may be separate but accessible to that device and the processor(s). In one example, the program instructions can be part of an installation package that when installed can be executed by the processor(s) to implement the corresponding component. In this case, the computer-readable medium may be a portable medium such as a CD, DVD, or flash drive or a memory maintained by a server from which the installation package can be downloaded and installed. In another example, the program instructions may be part of an application or applications already installed, and the computer-readable medium may include integrated memory such as a hard drive, solid state drive, random access memory (RAM), read-only memory (ROM), and the like.

The processor(s) for executing the instructions can include CPUs, GPUs, FPGAs, TPUs, or any other types of processor(s) configured to retrieve and execute instructions, or a combination thereof. The processor(s) can be integrated in a single device or distributed across devices.

The present invention may involve offline processing and online processing. The offline processing unit includes all the preprocessing steps, i.e. steps that can be performed on an input image or input data before a user annotates the image, which are independent to the user interactions and only need to be performed once. The intermediate results generated by these preprocessing steps are saved, which are loaded when the user start the online processing. The online processing requires user's interaction as the input, each step of which can be triggered multiple times according to the user's preference. By this design, the dominant computational load of the whole algorithm is handled in the offline processing unit, thereby minimize the user's waiting time during online processing. In the following, details of each step are presented.

In general, tissue slides are stained by more than one stain. For example, in the routine H&E staining, hematoxylin reacts like a basic dye with a purplish blue color, which stains acidic structure including the cell nucleus and organelles; while eosin is an acidic dye that is typically reddish or pink and stains basic structures including cytoplasm, cell wall, and extracellular fibers. Advanced staining, such as multiplexed immunohistochemistry (IHC) staining, may use more stains to detect multiple biomarkers in a single tissue section [12]. The general purpose of stain unmixing is to identify the different stains in the image, which is important for histopathology image segmentation. As each stain channel is associated with certain tissue type, the unmixed channels can provide more relevant image features than the original RGB channels to differentiate different types of tissues. According to embodiments, a color deconvolution method introduced in [13] is used to perform stain unmixing in our experiment for generating a plurality of image channels. In this method, the light intensity in RGB channel is formulated based on Lambert-Beers law, i.e.

$$I = I_0 \exp(-Ac),$$

where $I_0$ is the intensity of light entering the specimen (i.e., the white pixel value or highest intensity value within an image), I is the light detected (i.e., the pixel value in RGB channels), A is the amount of stains and c is a matrix related to the absorption factors of the stains. Given c, A can be estimated, which yield the intensity value for up to three stains. As an example, FIG. 2 shows an H&E image and the resulting stain channel images after stain unmixing.

For images with more than three stains, methods such as that proposed in [12] can be used based on the prior knowledge of stain co-localization. Stain unmixing, although desired, is not required by our interactive segmentation framework. In many cases, especially when the stain colors can be distinctively represented by the RGB components, using the original RGB channels may still achieve reasonable results.

Alternatively the image may be separated or unmixed into different image channels for example, Hematoxylin, eosin, and illumination channels for H&E stained images; and Hematoxylin, DAB and illumination channels for Ki67, Her2 or ER stained images. Please note that the invention is applicable to more than two channels.

Multi-scale Superpixel Generation

There are many approaches in the literature to generate superpixels [14] [15] [16] [17]. Using superpixels rather than individual pixels may be advantageous as the speed and the performance of image segmentation, in particular the speed of performing some preprocessing steps for segmentation, may be used. According to some embodiments, the *simple linear iterative clustering* (SLIC) method [10] (which adapts a k-means clustering approach) is used to efficiently generate superpixels. Two additional distinctive characters of SLIC algorithm make it especially beneficial for our application. First, the expected spatial extent of the superpixel is explicitly defined as an input parameter of the algorithm, which enables the user to directly apply the prior knowledge of the tissue object size in deciding the superpixel scale. For example, the diameter of a typical breast cancer tumor cell is usually greater than 10 μm, which corresponds to approximately 25 pixels in images at 20× resolution. Accordingly, the user can set the smallest superpixel scale close to the nucleus size so that the final segmentation can adhere to the nucleus boundaries. Secondly, the original SLIC algorithm use data point in the labxy space [10], where lab is the pixel color represented in CIELAB color space, and xy is the pixel position in the image plane. The lab channels can be replaced straightforwardly by the unmixed stain channels to achieve segmentations more adherent to the stained tissues boundaries.

Figure 3A:
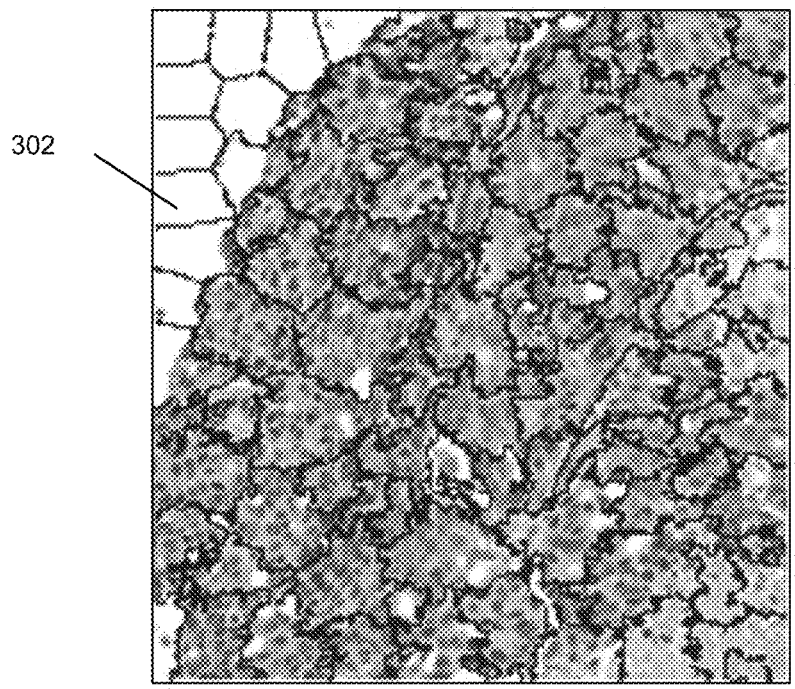
FIGS. 3A, 3B illustrate examples of superpixels at two scales, the scale parameter, i.e., the expected superpixels size is (A) 3600 pixels, (B) 1800 pixels.
Figure 3B:
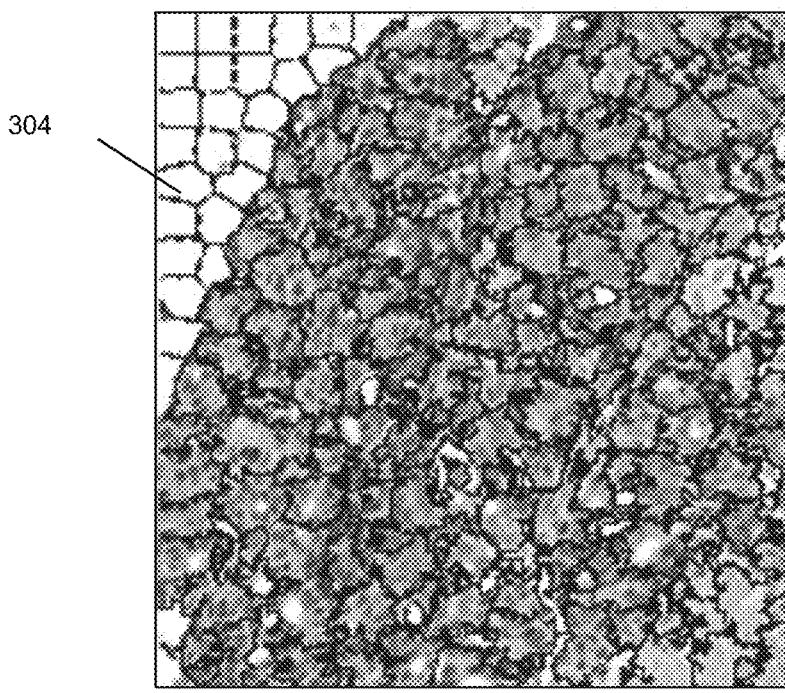

In our framework, we generate superpixels at multi-scales. The number of the scales can be determined arbitrarily by the user according to the complexity of the tissue type. For simplicity, the present invention is described based on two-scale superpixels, which are illustrated in FIG. 3. FIG. 3A shows a plurality of superpixels 302 having been automatically identified in a received digital image by using a first minimum superpixel size. FIG. 3B shows a further plurality of superpixels 304 having been automatically identified in the same digital image by using a second minimum superpixel size, the second minimum superpixel size being smaller than the first minimum superpixel size.

By using superpixel technique, pixels are grouped into perceptually meaningful atomic regions, which can be used to replace the rigid structure of the pixel grid. Superpixels capture image redundancy, provide a convenient primitive from which to compute image features, and greatly reduce the complexity of subsequent image processing tasks [10].

With respect to superpixels, larger superpixel segments provide richer features but may result in under segmentation. Conversely, smaller scale segments have less discriminative features but are able to offer a better boundary fit [11]. From the computational complexity point of view, smaller scale leads to a greater total number of the superpixels, entailing more computation in the subsequent process. The above tradeoffs are inevitable when using a single scale model. Therefore, we proposed an interactive segmentation framework based on multi-scale superpixels, so that the user can adjust the tradeoff according to the application needs. Thus, embodiments of the invention provide for a highly flexible image analysis system and corresponding method.

Feature Extraction

The image features are extracted for each superpixel in each image channel. Note that besides the original RGB channels and the unmixed stain channel, feature extraction can also be applied to other derived images, such as the gradient magnitude image, gradient direction image, and texture feature images such as that generated by Gabor filters. In our algorithm, in each image channel, the histogram of the pixel values for the pixels belonging to each superpixel is computed as the feature.

For example, for H&E stained image, the unmixed channels include hematoxylin (H) channel, eosin (E) channel, and the illumination (L) channel. For each channel, besides the intensity image, the gradient magnitude and direction images are also computed. This result in totally 9 image channels and 9 corresponding sets of histogram data or vectors are computed to characterize each superpixel.

The last step of offline processing is to build a graph for the superpixels at each scale. An undirected graph contains a set of nodes and a set of undirected arcs (or "edges") that connect these nodes. In an exemplary embodiment of the present invention a node corresponds to the center of a superpixel. Each node corresponds to a superpixel, and the weight of the arc connecting two adjacent superpixels is a cross-image-channel distance measure $M_{ij}$ (that may also be considered as a similarity measure) as defined in the following:

$$M_{ij} = \frac{1}{C}\sum_{c=1}^{C} D_c(i, j), \qquad (1)$$

where $M_{ij}$ is a distance between superpixel i and superpixel j computed by aggregating channel-specific difference measures of said two superpixels. The channel-specific difference measures are computed as derivatives of pixel-intensity-dependent feature sets, C is the total number of image channels (e.g., C=9 for the above H&E image example), and $D_c(i, j)$ is the Chi-Square distance between two histograms in channel c, which is defined by $$D_c(i, j) = \frac{1}{2}\sum_k \frac{(H_i^c(k) - H_j^c(k))^2}{(H_i^c(k) + H_j^c(k))}, \qquad (2)$$

where $HY_i^c$ and $H_j^c$ denote the histogram of superpixel i and j in image channel c, respectively, and k is the histogram bin index. Thus, $D_c(i, j)$ is a histogram distance of two histograms obtained for the two superpixels i and j. The higher $D_c(i, j)$, the more dissimilar the two superpixels are in respect to the type of histogram compared. $M_{ij}$ is a feature-set-dependent distance of two superpixels i, j.

Online Processing

After the offline preprocessing, the derived image channels (e.g., the unmixed images and the gradient images), generated superpixels and the graphs are available for the user to perform online processing without re-computing.

Graph Based Segmentation

We use image foresting transform (IFT) [18] to perform the segmentation, i.e., determine the label for each superpixel based on the markings provided by the user. IFT was observed to have several advantages over the widely used segmentation techniques based on the *graph cuts* [19]. The most relevant advantage for our application is that IFT based methods are capable of segmenting multiple objects in almost linear time regardless of the number of objects.

Figure 4:
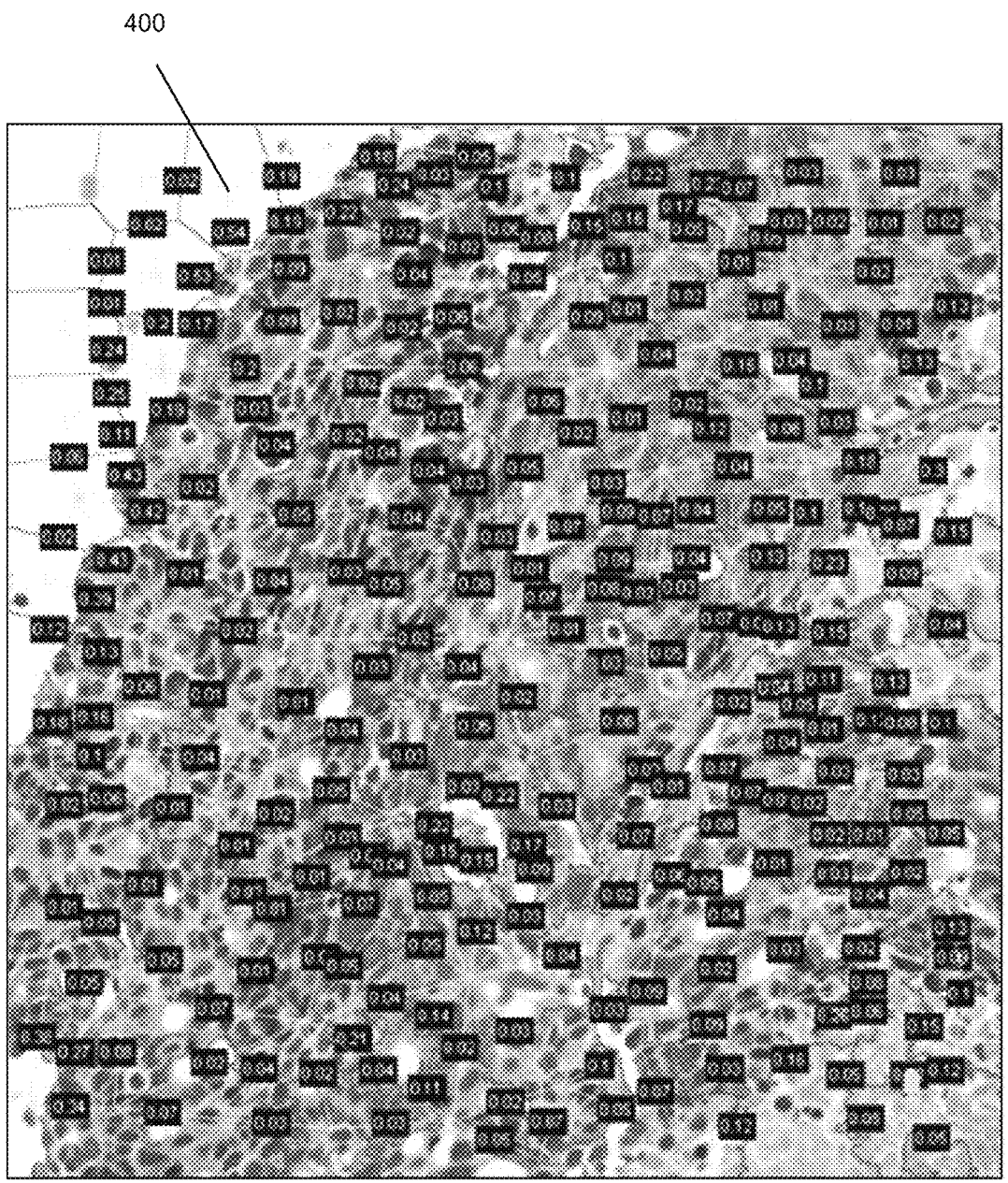
FIG. 4 illustrates an example of a superpixel graph, where the green lines represent the edges and the number on each edge is the corresponding weight.

IFT is a tool for designing image processing operators based on connectivity. Given a path and a suitable cost function, the IFT creates an *optimum-path* forest by defining a path with the lowest cost ending at each node [18]. IFT can be seen as a generalization of the classical Dijkstras's shortest-path algorithm [20]. Let G=(N, A) be an undirected graph 400 such as depicted, for example, in FIG. 4, where N is a set of nodes and A is a set of undirected arcs that connect these nodes. Each arc a EA in the graph is assigned a nonnegative weight (cost) $W_a$. A path ending at t is a sequence of consecutively adjacent nodes $\pi_t = \langle t_1, t_2, t_3, \ldots, t \rangle$ and a path that contains only one node $\pi_t = \langle t \rangle$ is called a trivial path. We denote by $\pi_t = \pi_s \cdot \langle s, t \rangle$ the extension of a path $\pi_s$ by an edge $\langle s, t \rangle$. Let f be a real-valued function that assigns a value $f(\pi_t)$ to any path in G to represent the path cost. A path $\pi_t$ is said to be optimum if $f(\pi_t) \leq f(\tau_t)$ for any other path $\tau_t$ in G, regardless of its origin. Defining $\Pi_t(G)$ as the set of all paths in G that end at t, an optimum value O(t) for a path ending at t is defined by $$O(t) = \min_{\pi_t \in \Pi_t(G)} \{f(\pi_t)\}, \qquad (3)$$

The optimum-path forest generated by IFT is a function P that assigns to each node t ∈V either its predecessor node P(t) ∈V in an optimum path or a distinctive marker PW=nil when the trivial path $\pi_t = \langle t \rangle$ is the optimum. When P(t)=nil, t is said to be a root. As the result, each node is associated to a root R(t) by following its optimum path backwards using P. Details of algorithm implementation can be found in [18].

In our interactive segmentation framework, the roots for IFT correspond to the markings (i.e., the labeled superpixels) provided by the user. Let L(t) denote the label given by the user to the superpixel s, and L(t)=0 when the superpixel s is not labeled. The path cost function $f(\pi_t)$ is defined as $$f(\langle t \rangle) = \begin{cases} 0, & \text{if } L(t) \neq 0 \\ +\infty, & \text{if } L(t) = 0 \end{cases}$$

$$f(\pi_s \cdot \langle s, t \rangle) = \max\{f(\pi_s), W(s, t)\},$$

where $W(s, t) = M_{s,t}$ (equation (1)) is the weight for the arc ("edge") connecting the superpixels (nodes) s and t. After IFT, the label assigned to each superpixel is the label belonging to the root of its optimum path. Note that other path cost function can also be used in the framework, e.g. the additive path cost function defined by $$f(\pi_s \cdot \langle s,t \rangle) = f(\pi_s) + W(s,t) \cdot (5)$$

This equation (4) makes large differences between adjacent superpixels the barriers for the propagation of the origin's label regardless the total number of nodes along the path. This is desirable for segmenting objects with very irregular shapes which may require a long path to span the object.

Figure 5:
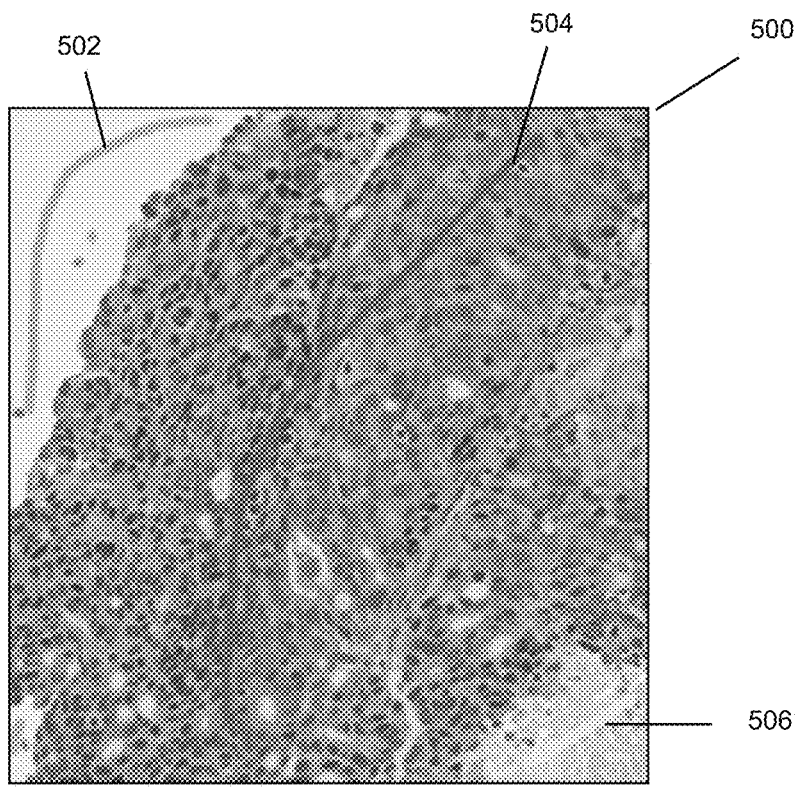
FIG. 5 illustrates an example of user-provided markings and the segmentation result based on larger scale superpixel graph (FIG. 3(A)) using image foresting transform.

FIG. 5 shows an example of user-provided markings for example annotations or other marking and the segmentation result using IFT. A first marking 504 spans several superpixels corresponding to a first tissue region, a second marking 506 spans several superpixels corresponding to a second tissue region and a third marking 502 spans several superpixels corresponding to the glass of the slide ("background").

Figure 6:
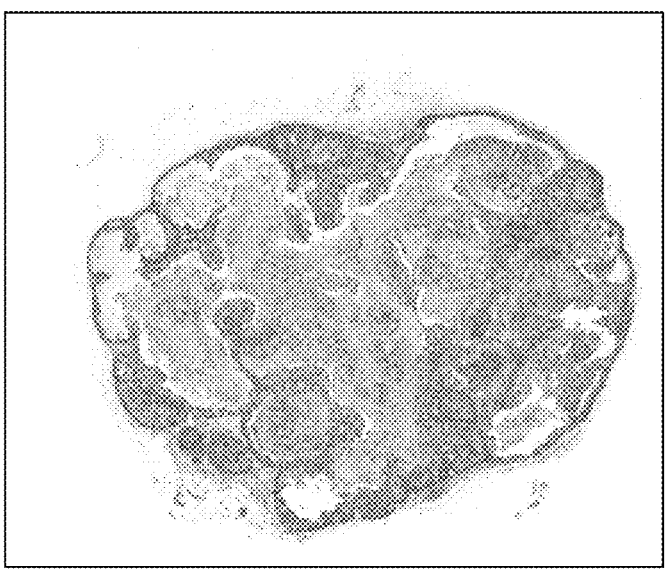
FIG. 6 illustrates an example of a whole slide H&E image with hematoxylin stained tumor tissues.

The fundamental advantage of the interactive segmentation framework lies in the fact that the user's markings not only provide the appearance information but also the spatial information to guide the segmentation. Therefore the physical locations of the markings are crucial to the segmentation performance. This also imposes great challenges to the user when the object to be segmented are highly scattered or morphologically very complex (e.g. the hematoxylin stained tumor tissues in the whole slide H&E image in FIG. 6). In this case, each disconnected part of the object receives an automatically or manually specified labeled seed in the form of a marking to make sure the label (i.e., the markings) is propagated correctly in that part of the image to all superpixels being more similar to said marked superpixel than to superpixels covered by a different marking.

Since manually placing seeds for all the individual parts can be labor intensive for the user, embodiments of the invention comprise automatically assigning superpixels to the most similar marked superpixel(s). Thus, the user needs only to manually mark a few typical parts to achieve similar segmentation performance as for marking all the parts.

According to embodiments, an automatic seed placement algorithm finds the non-labeled superpixels in the image which are very similar to the labeled superpixels and uses them as the additional seeds. A "very similar" superpixel can be, for example, a superpixel exceeding a similarity threshold in respect to another, marked superpixel.

According to embodiments, the processor of the image analysis system is configured to use a distance measure similar to that defined in equation (1) to evaluate the distance. Let $S_L = \{S_1^L, S_2^L, \ldots, S_i^L, \ldots\}$ denote the superpixels marked with label L by the user, and $\overline{H}_L^c$ be the average histogram of these superpixels in image channel c, i.e., $$\overline{H}_L^c(k) = \underset{s \in S_L}{\text{mean}}(H_s^c(k)), \tag{6}$$

where k is the histogram bin index. Then the distance $D_c$ of a superpixel j in comparison to the superpixels with label L is defined as:

$$M(j, S_L) = \sum_c \omega_c^L \cdot D_c(j, S_L), \tag{7}$$

where $$D_c(j, S_L) = \frac{1}{2} \sum_k \frac{(H_j^c(k) - \overline{H}_L^c(k))^2}{(H_j^c(k) + \overline{H}_L^c(k))}, \tag{8}$$

and $\omega_c^L$ is the weight for label L in channel c, which is computed in the following.

Let $\Gamma = \{L_1, L_2, \ldots, L, \ldots\}$ be all the labels provided by the user's markings. The difference measure between two labels $L_1$ and $L_2$ in channel c is defined as $$D_c(S_{L_1}, S_{L_2}) = \frac{1}{2} \sum_k \frac{(\overline{H}_{L_1}^c(k) - \overline{H}_{L_2}^c(k))^2}{(\overline{H}_{L_1}^c(k) + \overline{H}_{L_2}^c(k))}, \tag{9}$$

Then the weight $\omega_c^L$ is calculated by $$\omega_c^L = \frac{\sum_{l \in \Gamma, l \neq 1} D_c(S_l, S_L)}{\sum_{l \in \Gamma, l \neq 1} \sum_{c=1}^C D_c(S_l, S_L)}. \tag{10}$$

Thereby the channel that presents greater difference between label L and the other labels will be assigned larger weight, thus incorporating more relevant information in finding superpixels similar to that marked with label L.

The superpixel j will be automatically assigned label L if the following two conditions are met:

$$M(j, S_L) = \min_{l \in \Gamma} M(j, S_l) \text{ and}$$

$$M(j, S_L) < \epsilon, \tag{11}$$

where $\epsilon$ is a predefined threshold.

Figure 7A:
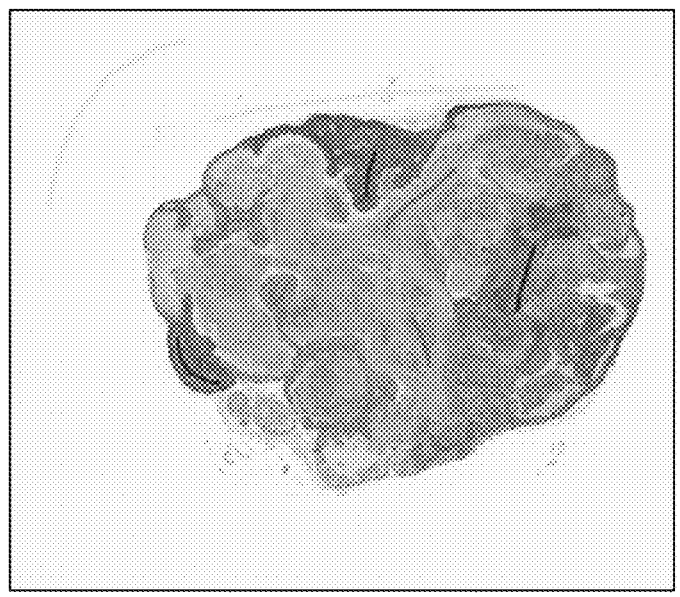
FIGS. 7A, 7B illustrate examples of (A) user-provided simple markings (with three labels) and the corresponding segmentation result using only these markings, (B) automatically placed seeds based on the simple markings.
Figure 7B:
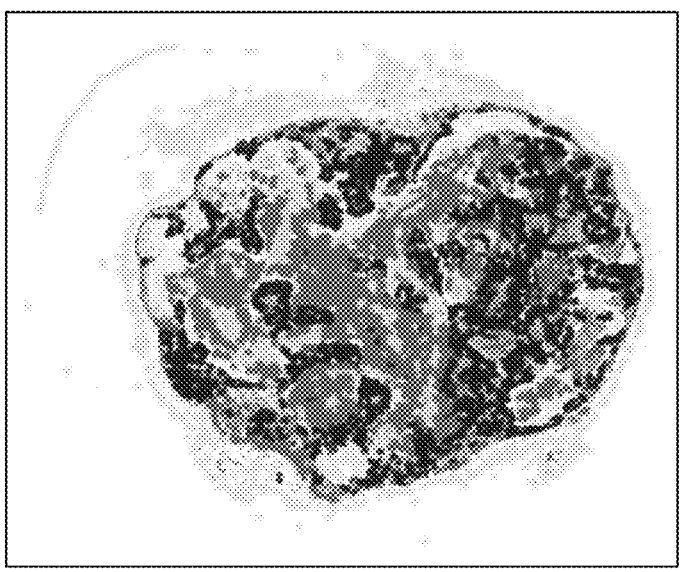
Figure 8A:
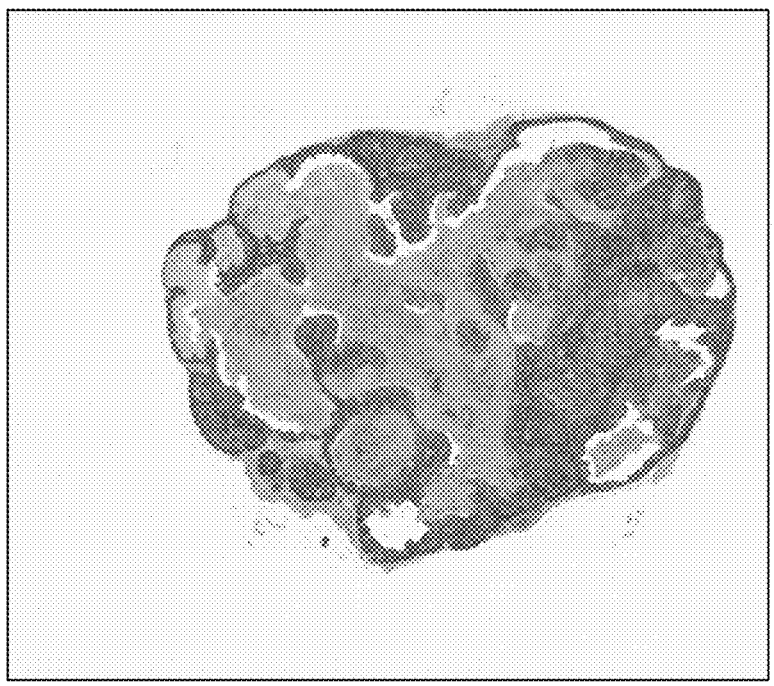
FIGS. 8A, 8B illustrate a comparison of segmentation result using (A) simple user-provided and the automatically placed seeds, (B) elaborated user-provided markings.
Figure 8B:
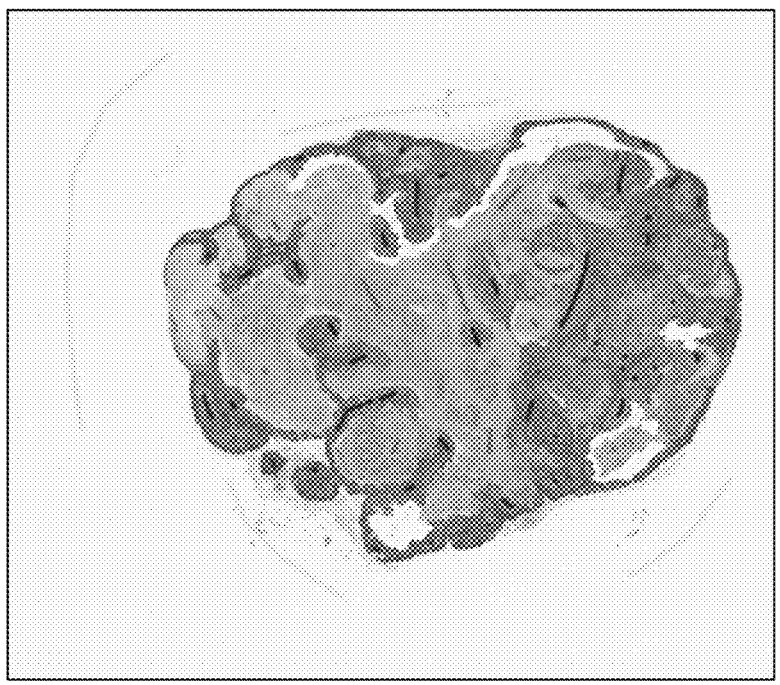

According to embodiments, the processor is configured for setting $\epsilon$ close to zero, e.g. to a value smaller than 0.01. By setting $\epsilon$ close to zero, superpixels which are almost identical to the labeled superpixels, as demonstrated in FIG. 7, can be found.

Hybrid-scale Superpixel Graph

Figure 9A:
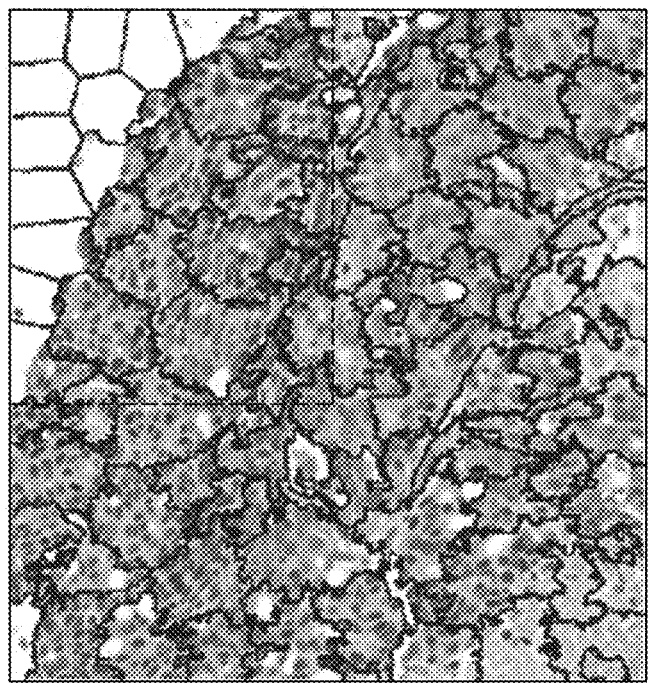
FIGS. 9A-9C illustrate examples of hybrid-scale superpixels. The (dotted) box covering the left upper image region indicates the user selected ROI. In (C), the blue superpixels are from (A) the larger scale, and the red superpixels are from (B) the smaller scale.
Figure 9B:
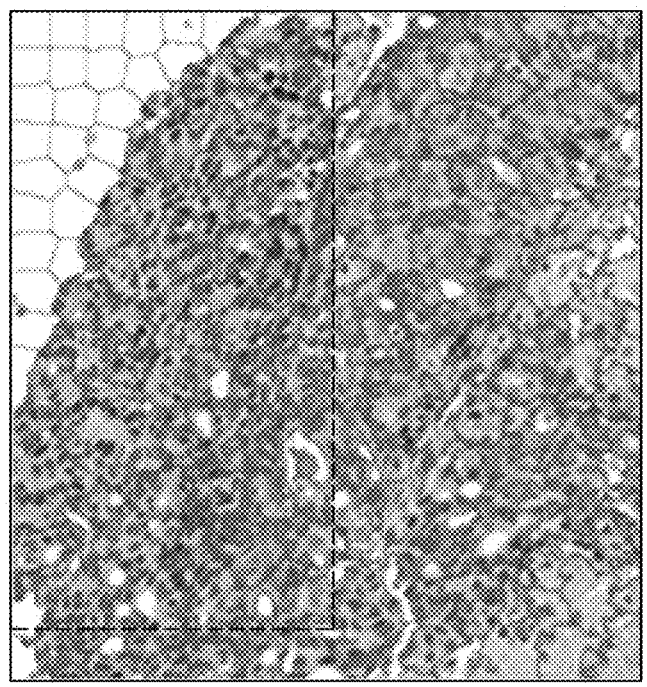

In general, superpixels at larger scale are computationally more efficient but may not generate optimum segmentation at the object boundaries (e.g, the boundary between the tissue and the background in FIG. 5). In FIG. 9(A), it is shown that the larger scale superpixels (in the rectangle in the left upper part of the image/with the red marker) include both the tissue and the background, thus assigning any label to it will yield false boundaries. In contrast, the smaller scale superpixels adhere to the tissue boundaries very well (FIG. 9(B)).

Figure 9C:
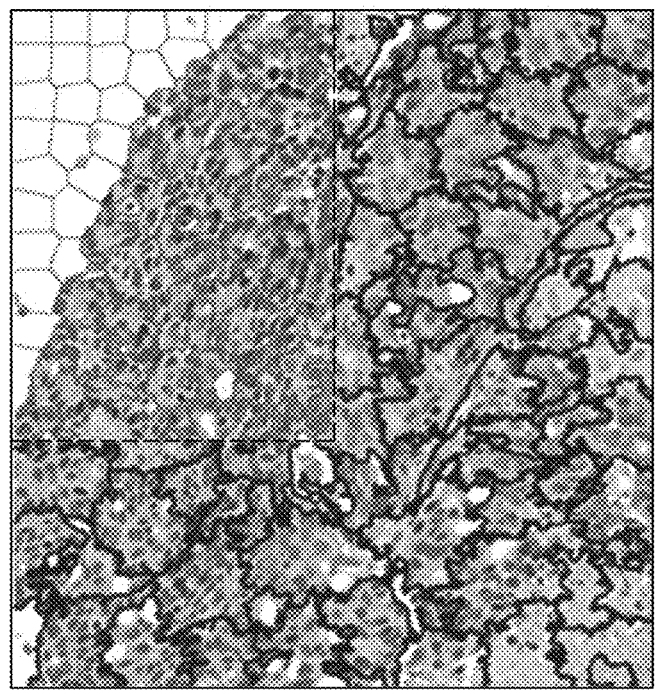
Figure 10:
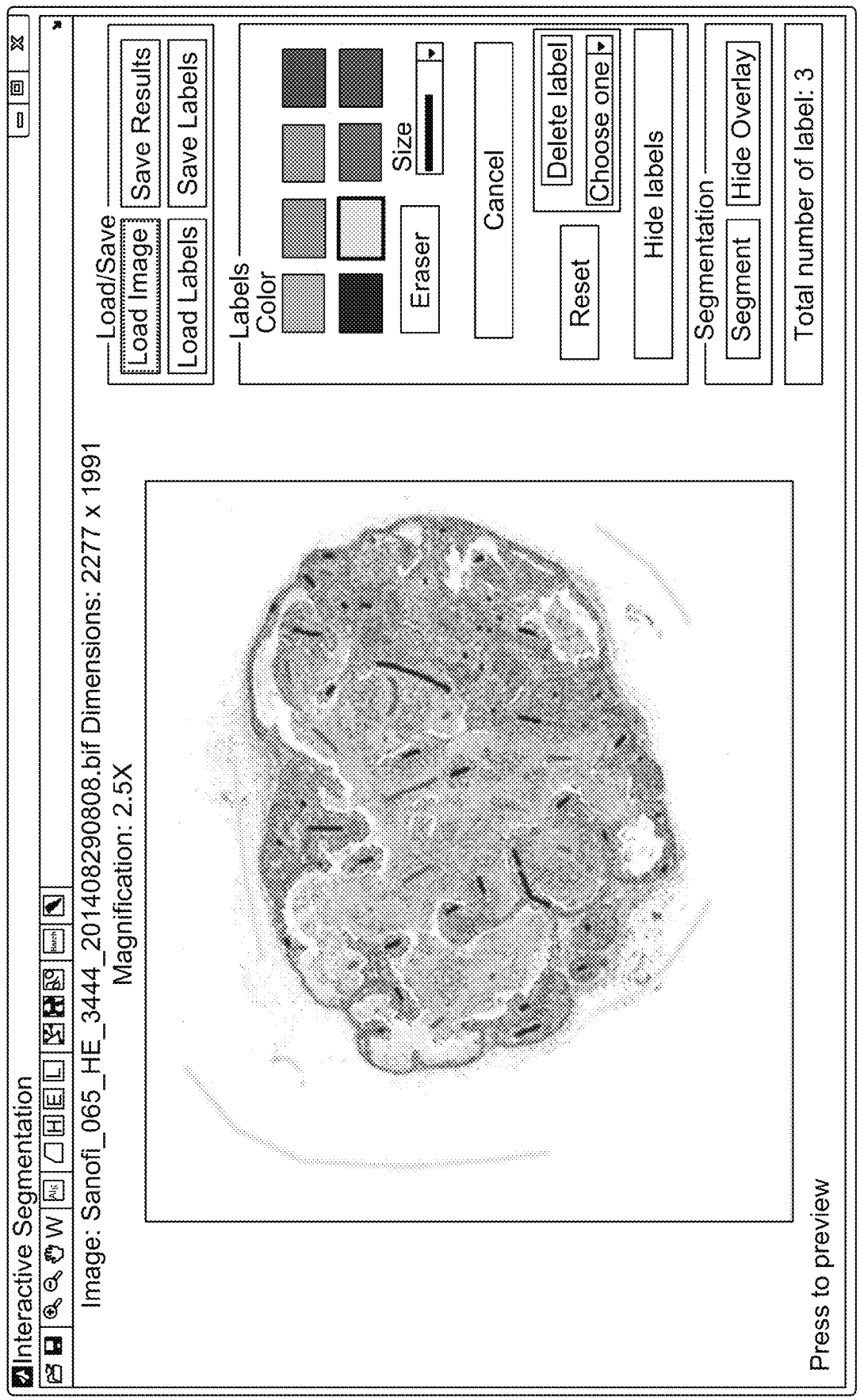
FIG. 10. illustrates the main graphical user interface (GUI) of the proposed framework.
Figure 11:
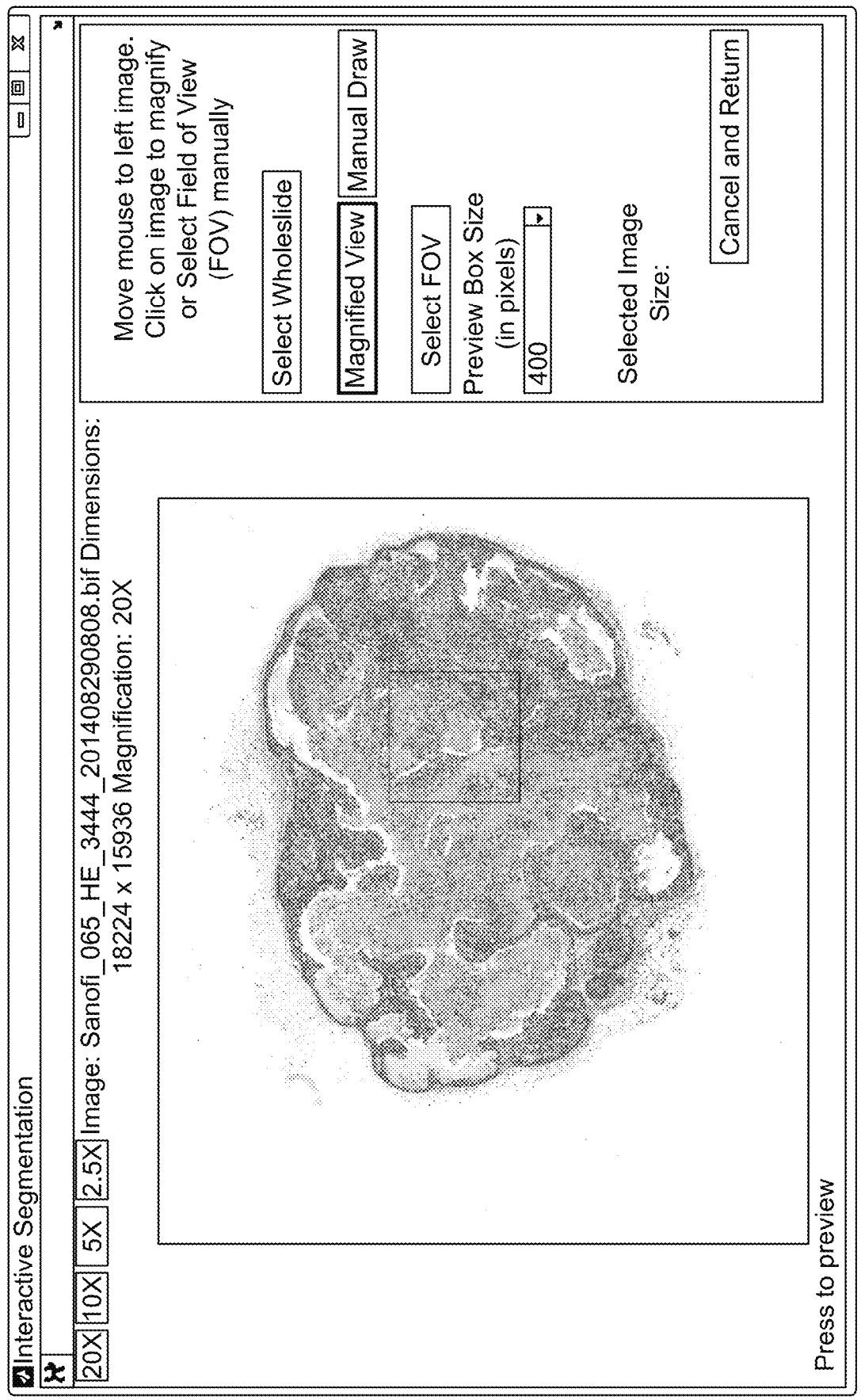
FIG. 11. illustrates the GUI to select whole slide image or field of view (FOV) image for processing.

Thus, embodiments of the invention that follow a hybrid-scale superpixel approach according to embodiments of the invention enable the user to select a region area (also referred to as "point of interest" or "region of interest" (ROI)) for segmentation refinement, e.g., the area indicated by the (dotted) box in FIG. 9. Within this ROI, the larger scale superpixels are replaced by the corresponding smaller scale superpixels to achieve better delineation of the tissue boundary. The user can select the ROI in which the segmentation results using the larger scale superpixels are not optimum. Then a new graph can be generated based on the hybrid-scale superpixels covered by the ROI. As the result, the outermost nodes of this graph correspond to the larger scale superpixels which overlap with the ROI boundary; and the inner nodes correspond to the smaller scale superpixels inside the ROI.

According to embodiments, the only additional computation is the arc weights (i.e., "edge weights") between the superpixels at different scales. At the boundary of ROI, it is very likely that adjacent superpixels at the different scales have overlapping pixels. This is allowed in our feature calculation, i.e., the overlapping pixels contribute to the histogram calculation for both scale superpixels. As for the final segmentation result, the label assigned to the overlapping pixels can be from either scale, preferably the smaller scale in most cases considering its superiority in boundary adherence.

After building the graph and or compiling and storing the graph data, seeds are needed to perform the segmentation. In case there are no existing markings in this ROI, the user can add seeds, e.g. one or more markings, either manually or automatically using the method described in the previous section. Alternatively, the larger scale superpixels along the ROI boundary which have already been assigned labels can serve as the seeds for segmentation on the new graph. The rationale behind this approach is that the user selected ROI is usually centered at the tissue boundaries. Thus, the ROI borders should locate at the inner part of the tissues, which usually have reasonable segmentation results even using larger scale superpixels.

According to an alternative embodiment, the processor is configured for refining segmentation results from superpixels generated by using a larger scale, the user is enabled to select, e.g. via a GUI, the ROIs along all the tissue boundaries before any segmentation is performed. Then the whole image is represented by a hybrid-scale superpixel graph, where smaller scale superpixels are along the tissue boundaries, and the larger scale superpixels lies within the tissues.

The ROI selection can also be semi-automatic, i.e., the user first select a ROI containing the tissue boundaries, then similar ROIs are searched automatically in the image. The search can be based on the labels provided by the user in the ROI, each label corresponding to a tissue type. For each label, similar superpixels are identified throughout the image using the method described in section 2.3.2; then the region in which all the labels have representative superpixels is selected as one ROI.

Lastly, according to a further alternative embodiment, fully automatic ROI selection is provided: the processor of the image analysis system is configured for automatically identifying boundary regions purely based on image features (i.e. by analyzing solely intensity-derived image feature information, not superpixel distance information). One such feature can be that generated by a commonly used edge detector, such as Sobel filer and Canny algorithm. The edge detection can be done in each unmixed channel image, followed by thresholding and morphological operation to remove noisy edges. The resulting edge maps can be combined and the regions which contain the most significant edge information can be automatically selected by the image analysis system as the ROIs.

REFERENCES

[1] Y. Boykov and M. Jolly, "Interactive graph cuts for optimal boundary and region segmentation of objects in ND images," in *IEEE ICCV*, 2001, pp. 105-112.

[2] C. Rother, V. Kolmogorov and A. Blake, "Grabcut: Interactive foreground extraction using iterated graph cuts," in *ACM SIGGRAPH*, 2004.

[3] X. Bai and G. Sapiro, "A geodesic framework for fast interactive image and video segmentation and matting,", in *IEEE ICCV*, 2007, pp. 1-8;

[4] A. Protere and G. Sapiro, "Interactive image segmentation via adaptive weighted distances", in *IEEE Transactions on Imaging Processing*, vol. 16, no. 4, pp. 1046-1057, 2007.

[5] L. Grady, "Random walks for image segmentation," in *IEEE Transactions on Pattern Analysis and Machine Intelligence*, vol. 28, no. 11, pp. 1768-1783, 2006.

[6] W. Yang, J. Cai, J. Zheng, and J. Luo, "User-friendly interactive image segmentation through unified combinatorial user inputs," in *IEEE Transactions on Image Processing*, vol. 19, no. 9, pp. 2470-2479, September 2010.

[7] P. E. Rauber, A. X. Falcao, T. V. Spina and R. J. De Rezende, "Interactive segmentation by image foresting transform on superpixel graph", in *26th Conference on Graphics, Patterns and Images (SIBGRAPI)*, 2013.

[8] H. S. Lee, J. Kim, S. J. Park and J. Kim, "Interactive segmentations as supervised classification with superpixels", in *Workshops on Computer Vision and Human Computation, CVPR* 2014.

[9] Y. Artan, "Interactive image segmentation using machine learning techniques", in *Canadian Conference on Computer and Robot Vision* 2011.

[10] R. Achanta, A. Shaji, K. Smith, A Lucchi, P. Fua and S. Susstrunk, "SLIC superpixels compared to state-of-art superpixel methods", in *Pattern Analysis and Machine Intelligence* 2012.

[11] N. M. Tan, Y. Xu, J. Liu, W. BI. Goh, F. Yin and T. Y. Wang, "Multi-scale superpixels classification for optic cup localization", in *IEEE International Symposium on Biomedical Imaging (ISBI)*, 2014.

[12] T. Chen and C. Srinivas, "Stain unmixing in brightfield multiplex immunohistochemistry images", in *MICCAI Workshop on Sparsity Techniques in Medical Imaging*, 2014.

[13] C. Ruifrok and D. A. Johnston, "Quantification of histochemical staining by color deconvolution," *Anal Quant Cyto Histo* 23(4), pp. 291-299, August 2001.

[14] P. Felzenszwalb and D. Huttenlocher, "Efficient Graph-Based Image Segmentation," in *Int'l J. Computer Vision*, vol. 59, no. 2, pp. 167-181, September 2004.

[15] A. Levinshtein, A. Stere, K. Kutulakos, D. Fleet, S. Dickinson, and K. Siddiqi, "Turbopixels: Fast superpixels using geometric flows", in *IEEE Transactions on Pattern Analysis and Machine Intelligence* (PAMI), 2009.

[16] J. Shi and J. Malik, "Normalized cuts and image segmentation", in *IEEE Transactions on Pattern Analysis and Machine Intelligence* (PAMI), 22(8):888-905, August 2000.

[17] O. Veksler, Y. Boykov, and P. Mehrani, " Superpixels and supervoxels in an energy optimization framework", in *European Conference on Computer Vision (ECCV)*, 2010.

[18] A. Falcao, J. Stolfi, and R. de Alencar Lotufo, "The image foresting transform: theory, algorithms, and applications," in *IEEE Transactions on Pattern Analysis and Machine Intelligence*, vol. 26, no. 1, pp. 19-29, 2004.

[19] Y. Boykov and M. P. Jolly, "Interactive graph cuts for optimal boundary and region segmentation of objects in N-D images," in 8th *IEEE International Conference on Computer Vision*, vol. 1,2001, pp. 105-112.

[20] E. W. Dijkstra, "A note on two problems in connexion with graphs". in *Numerische Mathematik*, vol. 1, Issue 1, pp 269-271,1959.

RESULTS

The propose framework is implemented for digital pathology applications, which is capable to process both whole slide and field of view (FOV) images.

CONCLUSION

The proposed interactive segmentation framework is a very flexible and effective tool for digital pathology image analysis applications.

We claim:

1. An image analysis system for segmenting a digital image of a biological sample, the digital image comprising at least a first image component depicting a first tissue type of the biological sample and a second image component depicting a second tissue type of the biological sample or background, the image analysis system comprising an interface for receiving the digital image and a processor configured for performing the segmentation, the segmentation comprising:

generating a plurality of image channels by applying color deconvolution on the received digital image or by separating RGB color components of the digital image into respective image channels, wherein each of the image channels is a digital image whose pixel intensity values correspond to the color components of the respective channel;

identifying a plurality of superpixels in the received digital image;

for each of the superpixels and for each of the image channels, extracting a feature set, the feature set comprising and/or being derived from pixel intensity values of pixels contained in said superpixel;

receiving at least a first and a second marking provided by a user or provided automatically, the first marking covering one or more first ones of the superpixels, the first marked superpixels representing regions of the first image component, the second marking covering one or more second ones of the superpixels, the second marked superpixels representing regions of the second image component;

for each of the plurality of image channels, comparing the image channel specific feature set of at least one of the first marked superpixels with the image channel specific feature set of at least one of the second marked superpixels for obtaining an image channel specific marker-difference score;

representing the plurality of superpixels as a graph, whereby the center of each of the identified superpixels is represented by a node and whereby the nodes representing centers of adjacent superpixels are connected by a respective edge, wherein the computation of each of the edges comprises:
  computing, for each of the image channels, a feature set distance by comparing the image channel specific feature sets of the neighboring superpixels connected by said edge;
  multiplying the feature set distance obtained for each of the edges and for each of the image channels with the image channel specific marker-difference score computed for said image channel, thereby computing image-channel specific edge weights;
  for each of the edges, aggregating all image-channel specific edge weights and using the aggregated edge weight as the edge weight of the edge;

for each unmarked superpixel of the plurality of superpixels:
  computing a first combined distance between said unmarked superpixel and the one or more first marked superpixels by means of a graph traversal algorithm, the first combined distance being a derivative of a feature-set-dependent distance between said unmarked superpixel and the one or more first marked superpixels and of a spatial distance between said unmarked superpixel and the one or more first marked superpixels;
  computing a second combined distance between said unmarked superpixel and the one or more second marked superpixels by means of a graph traversal algorithm, the second combined distance being a derivative of a feature-set-dependent distance between said unmarked superpixel and the one or more second marked superpixels and of a spatial distance between said unmarked superpixel and the one or more second marked superpixels;
  assigning the unmarked superpixel to the first image component if the first combined distance is smaller than the second combined distance and otherwise associating the unmarked superpixel to the second image component, thereby segmenting the digital image.

2. The image analysis system of claim 1, the representation of the plurality of superpixels as a graph comprising:
  for each of the edges, computing a weight by comparing the feature sets of the neighboring superpixels connected by said edge, whereby the weight negatively correlates with the degree of similarity of the compared feature sets.

3. The image analysis system of claim 2, whereby each of the computed weights assigned to one of the edges is:
  a histogram-distance between the two intensity histograms computed for the two nodes connected by said edge;
  a histogram-distance between the two gradient magnitude histograms computed for the two nodes connected by said edge;
  a histogram-distance between the two gradient direction histograms computed for the two nodes connected by said edge;
  a distance computed as a derivative of one or more of said histogram-distances.

4. The image analysis system of claim 2,
wherein the computation of the first combined distance for any of the unmarked superpixels comprises:
  computing a first path distance for each of a plurality of first paths, each first path connecting the node representing the center of the unmarked superpixel and a node representing a center of one of the first marked superpixels, each first path distance being computed as the sum of the weights of the edges between neighboring superpixels pairs along a respective one of the first paths; and
  using the minimum computed first path distance as the first combined distance calculated for the unmarked superpixel;
wherein the computation of the second combined distance for any of the unmarked superpixels comprises:
  computing a second path distance for each of a plurality of second paths, each second path connecting the node representing the center of the unmarked superpixel and a node representing a center of one of the second marked superpixels, each second path distance being computed as the sum of the weights of the edges between neighboring superpixels pairs along a respective one of the second paths; and
  using the minimum computed second path distance as the second combined distance calculated for the unmarked superpixel.

5. The image analysis system of claim 2, wherein the computation of the first combined distance for any of the unmarked superpixels comprises:
  computing a first path distance for each of a plurality of first paths, each first path connecting the node representing the center of the unmarked superpixel and a node representing a center of one of the first marked superpixels, each first path distance being the maximum weight assigned to any one of the edges between neighboring superpixels pairs along a respective one of the first paths; and
  using the minimum computed first path distance as the first combined distance calculated for the unmarked superpixel;
wherein the computation of the second combined distance for any of the unmarked superpixels comprises:
  computing a second path distance for each of a plurality of second paths, each second path connecting the node representing the center of the unmarked superpixel and a node representing a center of one of the second marked superpixels, each second path distance being the maximum weight assigned to any one of the edges between neighboring superpixels pairs along a respective one of the second paths; and
  using the minimum computed second path distance as the second combined distance calculated for the unmarked superpixel.

6. The image analysis system of claim 1,
the processor being configured for performing a pre-processing operation before the receipt of the first and second marking, the pre-processing operation comprising:

performing the identification of the plurality of superpixels;

performing, for each of the superpixels, the extraction of the feature set; and performing the representation of the plurality of superpixels as the graph;

wherein the processor is configured for performing, after having executed the pre-processing operation:

using the graph for computing the first and second combined distance;

receiving another first and another second marking, the other first marking covering one or more other first marked ones of the superpixels, the other first marked superpixels representing other regions of the first image component, the other second marking covering one or more other second marked ones of the superpixels, the other second marked superpixels representing other regions of the second image component;

computing, for each of the superpixels, another first and another second combined distance using the topology of the graph and the other first and second markings;

re-segmenting the digital image by associating unmarked superpixel to the first image component if the other first combined distance is smaller than the other second combined distance and otherwise associating the unmarked superpixel to the second image component.

7. The image analysis system of claim 1, the extraction of the feature set for each of the superpixels comprising:

generating an intensity histogram from all pixels contained in said superpixel; and/or computing a gradient direction histogram from all pixels contained in said superpixel, the gradient direction being indicative of the direction of a directional change in the intensity in the digital image; and/or computing a gradient magnitude histogram from all pixels contained in said superpixel, the gradient magnitude being indicative of the magnitude of a directional change in the intensity in the digital image; and/or computing a texture feature from all pixels contained in said superpixel.

8. The image analysis system of claim 1, the processor being configured for:

performing the identification of the plurality of superpixels in the received digital image such that each superpixel has, given the resolution of the received digital image, a minimum size that is the typical size of a cell nucleus.

9. The image analysis system of claim 8, whereby the further minimum size is at least 1.5 times the typical size of a cell nucleus.

10. The image analysis system of claim 1, the processor being configured for executing, in a pre-processing operation:

performing the identification of the plurality of superpixels in the received digital image such that each superpixel has a first minimum size and performing the representation of said plurality of superpixels in a first graph; and identifying a further plurality of superpixels in the received digital image such that each of the further superpixels has a further minimum size that is smaller than the first minimum size and representing the further plurality of superpixels in a further graph;

the processor being configured for executing, after completion of the pre-processing operation:

receiving a user's selection of a region of interest in the received digital image;

in response to the receiving of the user's selection, generating a hybrid superpixel graph, the hybrid superpixel graph representing digital image areas within the region of interest with nodes and edges of the further graph and representing superpixels outside the regions of interest with nodes and edges of the first graph; and using the hybrid superpixel graph for computing the first and second combined distances and for assigning each unmarked first or further superpixel to the first or second image component.

11. The image analysis system of claim 1, the image analysis system further comprising:

a data entry device, wherein the first and/or second marker and optionally also the region of interest are selected by a user using the data entry device.

12. The image analysis system of claim 1, the image analysis system further comprising:

a display monitor, the processor being configured for overlaying all superpixels assigned to the one or more first marked superpixels with a first color and for overlying all superpixels assigned to the one or more second marked superpixels with a second color and for displaying the digital image and the overlaid first and second color via the display monitor.

13. The image analysis system of claim 1, the biological sample being a histopathology sample.

14. An image analysis method for automatically segmenting a digital image of a biological sample, the digital image comprising at least a first image component depicting a first tissue type of the biological sample and a second image component depicting a second tissue type of the biological sample or background, the image analysis method being performed by an image analysis system, the image analysis method comprising:

generating a plurality of image channels by applying color deconvolution on the received digital image or by separating RGB color components of the digital image into respective image channels, wherein each of the image channels is a digital image whose pixel intensity values correspond to the color component of the respective channel;

identifying a plurality of superpixels in the received digital image;

for each of the superpixels and for each of the image channels, extracting a feature set, the feature set comprising and/or being derived from pixel intensity values of pixels contained in said superpixel;

receiving at least a first and a second marking provided by a user or provided automatically, the first marking covering one or more first ones of the superpixels, the first marked superpixels representing regions of the first image component, the second marking covering one or more second ones of the superpixels, the second marked superpixels representing regions of the second image component;

for each of the plurality of image channels, comparing the image channel specific feature set of at least one of the first marked superpixels with the image channel specific feature set of at least one of the second marked image channel superpixel for obtaining an image channel specific marker-difference score;

representing the plurality of superpixels as a graph, whereby the center of each of the identified superpixels is represented as a node and whereby the nodes representing centers of adjacent superpixels are connected by a respective edge, wherein the computation of each of the edges comprises:
- computing, for each of the image channels, a feature set distance by comparing the image channel specific feature sets of the neighboring superpixels connected by said edge;
- multiplying the feature set distance obtained for each of the edges and for each of the image channels with the image channel specific marker-difference score computed for said image channel, thereby computing image-channel specific edge weights;
- for each of the edges, aggregating all image-channel specific edge weights and using the aggregated edge weight as the edge weight of the edge;

for each unmarked superpixel of the plurality of superpixels:
- computing a first combined distance between said unmarked superpixel and the one or more first marked superpixels by means of a graph traversal algorithm, the first combined distance being a derivative of a feature-set-dependent distance between said unmarked superpixel and the one or more first marked superpixels and of a spatial distance between said unmarked superpixel and the one or more first marked superpixels;
- computing a second combined distance between said unmarked superpixel and the one or more second marked superpixels by means of a graph traversal algorithm, the second combined distance being a derivative of a feature-set-dependent distance between said unmarked superpixel and the one or more second marked superpixels and of a spatial distance between said unmarked superpixel and the one or more second marked superpixels;
- assigning the unmarked superpixel to the first image component if the first combined distance is smaller than the second combined distance and otherwise associating the unmarked superpixel to the second image component, thereby segmenting the digital image.

* * * * *